(12) United States Patent
Asanuma et al.

(10) Patent No.: US 7,296,401 B2
(45) Date of Patent: Nov. 20, 2007

(54) DEVICE FOR PURIFYING THE EXHAUST GAS OF AN INTERNAL COMBUSTION ENGINE

(75) Inventors: Takamitsu Asanuma, Susono (JP); Toshiaki Tanaka, Numazu (JP); Shinya Hirota, Susono (JP); Kazuhiro Itoh, Mishima (JP); Koichiro Nakatani, Susono (JP); Koichi Kimura, Susono (JP); Kotaro Hayashi, Mishima (JP); Souichi Matushita, Numazu (JP); Yukihiro Tsukasaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/829,160

(22) Filed: Apr. 22, 2004

(65) Prior Publication Data

US 2004/0244365 A1 Dec. 9, 2004

Related U.S. Application Data

(62) Division of application No. 09/904,875, filed on Jul. 16, 2001, now abandoned.

(30) Foreign Application Priority Data

Jul. 21, 2000 (JP) ............................. 2000-226224
Oct. 18, 2000 (JP) ............................. 2000-318344

(51) Int. Cl.
*F01N 3/00* (2006.01)
(52) U.S. Cl. ..................... 60/285; 60/287; 60/288; 60/297; 60/295; 422/169; 422/171

(58) Field of Classification Search ............... 60/274, 60/285, 295, 297, 301, 311, 287, 288; 422/169, 422/170, 171, 177
See application file for complete search history.

(56) References Cited

U.S. PATENT DOCUMENTS

| 4,902,487 | A |   | 2/1990  | Cooper et al. |
| 5,100,632 | A | * | 3/1992  | Dettling et al. .......... 423/213.5 |
| 5,473,890 | A |   | 12/1995 | Takeshima et al. |
| 5,709,722 | A |   | 1/1998  | Nagai et al. |
| 5,811,364 | A |   | 9/1998  | Suga et al. |

(Continued)

FOREIGN PATENT DOCUMENTS

EP 0 984 142 A1 8/2000

(Continued)

OTHER PUBLICATIONS

U.S. Appl. No. 09/979,643, filed Nov. 26, 2001, Nakatani et al.

*Primary Examiner*—Tu M. Nguyen
(74) *Attorney, Agent, or Firm*—Oliff & Berridge, PLC

(57) ABSTRACT

A device for purifying the exhaust gas of an internal combustion engine is disclosed. The device includes a particulate filter arranged in the exhaust system, which carries a catalyst for absorbing and reducing $NO_x$. The catalyst absorbs $NO_x$ when the air-fuel ratio in the surrounding atmosphere thereof is lean and releases the absorbed $NO_x$ to purify $NO_x$ by reduction when the air-fuel ratio is stoichiometric or rich. The device further includes a catalytic apparatus for purifying $NO_x$ arranged in the exhaust system upstream of the particulate filter, which has an oxidation function.

4 Claims, 21 Drawing Sheets

U.S. PATENT DOCUMENTS

| | | | |
|---|---|---|---|
| 5,850,735 A | 12/1998 | Araki et al. | |
| 5,937,639 A * | 8/1999 | Sasaki et al. | 60/278 |
| 5,974,791 A | 11/1999 | Hirota et al. | |
| 6,003,305 A * | 12/1999 | Martin et al. | 60/274 |
| 6,167,696 B1 | 1/2001 | Maaseidvaag et al. | |
| 6,293,096 B1 | 9/2001 | Khair et al. | |
| 6,314,722 B1 | 11/2001 | Matros et al. | |
| 6,539,709 B2 * | 4/2003 | Kubo et al. | 60/301 |
| 6,557,342 B2 * | 5/2003 | Suga et al. | 60/301 |
| 6,568,178 B2 | 5/2003 | Hirota et al. | |
| 6,588,204 B2 | 7/2003 | Hirota et al. | |
| 6,729,125 B2 * | 5/2004 | Suga et al. | 60/285 |
| 6,735,940 B2 | 5/2004 | Stroia et al. | |
| 6,742,328 B2 | 6/2004 | Webb et al. | |
| 6,823,663 B2 * | 11/2004 | Hammerle et al. | 60/286 |
| 6,843,054 B2 * | 1/2005 | Taylor et al. | 60/275 |
| 6,871,489 B2 * | 3/2005 | Tumati et al. | 60/285 |
| 6,912,847 B2 * | 7/2005 | Deeba | 60/297 |
| 6,938,412 B2 * | 9/2005 | Li et al. | 60/300 |
| 2001/0035006 A1 | 11/2001 | Dou et al. | |
| 2001/0052232 A1 | 12/2001 | Hoffmann et al. | |
| 2003/0115859 A1 * | 6/2003 | Deeba | 60/297 |

FOREIGN PATENT DOCUMENTS

| | | | | |
|---|---|---|---|---|
| JP | 55050255 | | 11/1981 | |
| JP | 58-137423 | | 8/1983 | |
| JP | 59-30507 | | 2/1984 | |
| JP | 60-235620 | | 11/1985 | |
| JP | 61-28709 | | 8/1986 | |
| JP | 63-100218 | | 5/1988 | |
| JP | 02070389 | | 12/1991 | |
| JP | 04031614 A | | 3/1992 | |
| JP | 4-129829 | | 4/1992 | |
| JP | 5-98932 | | 4/1993 | |
| JP | 03344731 | | 7/1993 | |
| JP | 6-117221 | | 4/1994 | |
| JP | 06117221 A | * | 4/1994 | |
| JP | 6-159037 | | 6/1994 | |
| JP | 6-159037 A | | 6/1994 | |
| JP | 06159037 A | * | 6/1994 | |
| JP | 6-200741 | | 7/1994 | |
| JP | 06200741 A | * | 7/1994 | |
| JP | 6-272541 A | | 9/1994 | |
| JP | 7-119444 | | 5/1995 | |
| JP | 7-189656 | | 7/1995 | |
| JP | 05354427 | | 7/1995 | |
| JP | 07180536 A | | 7/1995 | |
| JP | 7-106290 B2 | | 11/1995 | |
| JP | 8-338229 | | 12/1996 | |
| JP | 9-94434 A | | 4/1997 | |
| JP | 10-220218 | | 8/1998 | |
| JP | 10-306717 | | 11/1998 | |
| JP | 11-300165 A | | 11/1999 | |
| JP | 11-336534 | | 12/1999 | |
| JP | 3012249 B2 | | 12/1999 | |
| JP | 2000-18026 A | | 1/2000 | |
| JP | A-2000-45755 | | 2/2000 | |
| WO | WO 00/42302 | | 7/2000 | |

* cited by examiner ate filter absorbs $NO_x$ in the form of nitric acid ions when
DEVICE FOR PURIFYING THE EXHAUST GAS OF AN INTERNAL COMBUSTION ENGINE

BACKGROUND OF THE INVENTION

1. Field of the Invention

The present invention relates to a device for purifying the exhaust gas of an internal combustion engine.

2. Description of the Related Art

The exhaust gas of an internal combustion engine and, particularly, of a diesel engine, contains $NO_x$. Therefore, it has been suggested that a filter for absorbing and reducing $NO_x$ should be arranged in the exhaust system. The particulate filter absorbs $NO_x$ in the form of nitric acid ions when the oxygen concentration of the surrounding atmosphere thereof is high and releases the absorbed $NO_x$ when the oxygen concentration of the surrounding atmosphere becomes low. Therefore, the particulate filter absorbs $NO_x$ favorably from an exhaust gas of a diesel engine in which the combustion takes place in an excess air condition. If the air-fuel ratio of the surrounding atmosphere is periodically made rich or stoichiometric and thus the oxygen concentration is made low, $NO_x$ is released from the particulate filter and thereafter the released $NO_x$ can be reduced by the reducing material such as HC and thus $NO_x$ can be purified before it is emitted into the outside of the engine exhaust system.

By the way, the exhaust gas of a diesel engine also contains particulates comprising carbon as a chief component. The particulates are required to be treated before they are emitted into the outside of the engine exhaust system. Thus, it has been suggested that a particulate filter should be arranged in the exhaust system to trap the particulate. If such a particulate filter carries the above-mentioned catalyst for absorbing and reducing $NO_x$, the particulate filter can absorb $NO_x$ and can also oxidize and remove the particulates. Thus, it is effective for the purifying of the exhaust gas that a particulate filter carrying the catalyst for absorbing and reducing $NO_x$ is arranged in the exhaust system.

The structure of the particulate filter is usually a wall-flow type in which the exhaust gas passes through the pores of the trapping wall. Therefore, the area for carrying the catalyst on the trapping wall with which the exhaust gas is mainly in contact is necessarily smaller than that an usual particulate filter, and thus the particulate filter carrying the catalyst for absorbing and reducing $NO_x$ cannot purify sufficiently $NO_x$ in the exhaust gas by itself. Besides, if the catalyst for absorbing and reducing $NO_x$ carried on the particulate filter is covered with the trapped particulates, the catalyst cannot absorb sufficiently $NO_x$ in the exhaust gas. Therefore, the particulate filter cannot sufficiently purify the $NO_x$ in the exhaust gas by itself.

SUMMARY OF THE INVENTION

Therefore, an object of the present invention is to provide a device for purifying the exhaust gas of an internal combustion engine, which can purify $NO_x$ in the exhaust gas more sufficiently than the particulate filter carrying the catalyst for absorbing and reducing $NO_x$.

According to the present invention, there is provided a first device for purifying the exhaust gas of an internal combustion engine comprising: a particulate filter, arranged in the exhaust system, which carries a catalyst for absorbing and reducing $NO_x$, the catalyst absorbing $NO_x$ when the air-fuel ratio in the surrounding atmosphere thereof is lean and releasing the absorbed $NO_x$ to purify $NO_x$ by reduction when said air-fuel ratio is the stoichiometric or rich; and a catalytic apparatus, for purifying $NO_x$, arranged in the exhaust system upstream the particulate filter, which has an oxidation function.

According to the present invention, there is provided a second device for purifying the exhaust gas of an internal combustion engine comprising: a particulate filter, arranged in the exhaust system, which carries an oxidation catalyst, and a catalytic apparatus for purifying $NO_x$ arranged in the exhaust system upstream the particulate filter.

BRIEF DESCRIPTION OF THE DRAWINGS

In the drawings:

FIG. 6 is a view showing the amounts of produced smoke, $NO_x$, and the like;

FIG. 13 is a view showing the opening degree of the throttle valve and the like;

DESCRIPTION OF THE PREFERRED EMBODIMENT

Figure 1:
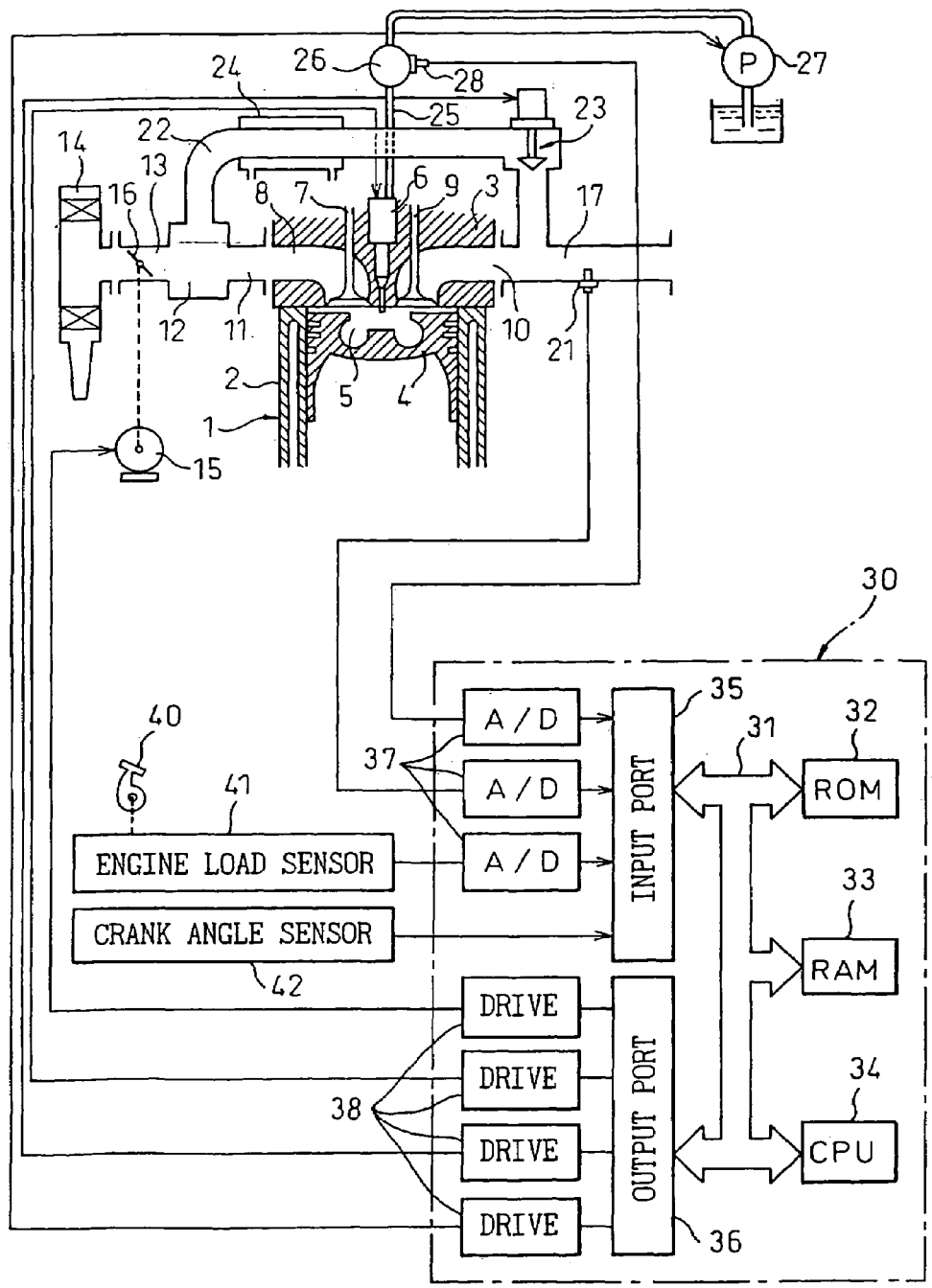
FIG. 1 is a schematic vertical sectional view of a diesel engine with a device for purifying the exhaust gas according to the present invention.
Figure 2:
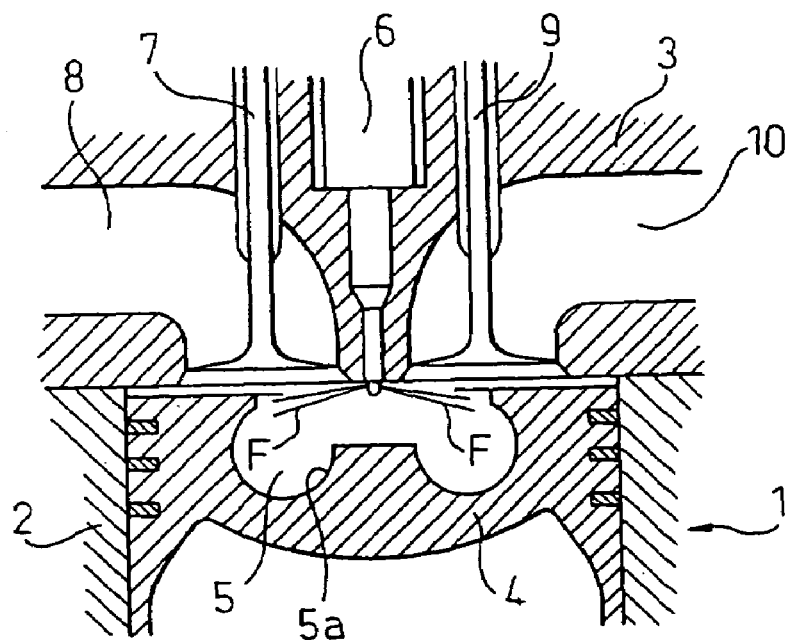
FIG. 2 is an enlarged vertical sectional view of a combustion chamber of the diesel engine of FIG. 1.
Figure 3:
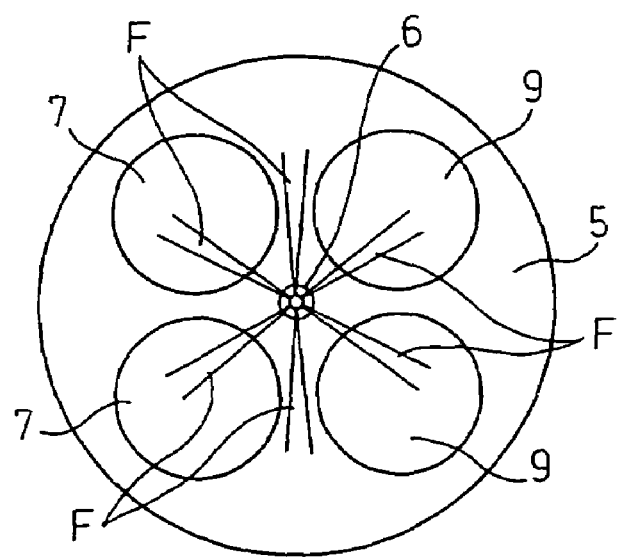
FIG. 3 is a bottom view of a cylinder head of the diesel engine of FIG. 1.

FIG. 1 is a schematic vertical sectional view of a four-stroke diesel engine with a device for purifying the exhaust gas according to the present invention. FIG. 2 is an enlarged vertical sectional view of a combustion chamber of diesel engine of FIG. 1. FIG. 3 is a bottom view of a cylinder head of diesel engine of FIG. 1. Referring to FIGS. 1-3, reference numeral 1 designates an engine body, reference numeral 2 designates a cylinder-block, reference numeral 3 designates a cylinder-head, reference numeral 4 designates a piston, reference numeral 5a designates a cavity formed on the top surface of piston 4, reference numeral 5 designates a combustion chamber formed in the cavity 5a, reference numeral 6 designates an electrically controlled fuel injector, reference numeral 7 designates a pair of intake valves, reference numeral 8 designates an intake port, reference numeral 9 designates a pair of exhaust valves, and reference numeral 10 designates an exhaust port. The intake port 8 is connected to a surge tank 12 via a corresponding intake tube 11. The surge tank 12 is connected to an air-cleaner 14 via an intake duct 13. A throttle valve 16 driven by an electric motor 15 is arranged in the intake duct 13. On the other hand, the exhaust port 10 is connected to an exhaust pipe 18 via an exhaust manifold 17.

As shown in FIG. 1, an air-fuel ratio sensor 21 is arranged in the exhaust manifold 17. The exhaust manifold 17 and the surge tank 12 are connected with each other via an EGR passage 22. An electrically controlled EGR control valve 23 is arranged in the EGR passage 22. An EGR cooler 24 is arranged around the EGR passage 22 to cool the EGR gas flowing in the EGR passage 22. In the embodiment of FIG. 1, the engine cooling water is led into the EGR cooler 24 and thus the EGR gas is cooled by the engine cooling water.

On the other hand, each fuel injector 6 is connected to the fuel reservoir, that is, a common rail 26 via a fuel supply tube 25. Fuel is supplied to the common rail 26 from an electrically controlled variable discharge fuel pump 27. Fuel supplied to the common rail 26 is supplied to the fuel injector 6 via each fuel supply tube 25. A fuel pressure sensor 28 for detecting a fuel pressure in the common rail 26 is attached to the common rail 26. The discharge amount of the fuel pump is controlled on the basis of an output signal of the fuel pressure sensor 28 such that the fuel pressure in the common rail 26 becomes the target fuel pressure.

Reference numeral 30 designates an electronic control unit. It is comprised of a digital computer and is provided with a ROM (read only memory) 32, a RAM (random access memory) 33, a CPU (microprocessor) 34, an input port 35, and an output port 36 connected with each other by a bi-directional bus 31. The output signals of the air-fuel sensor 21 and the fuel pressure sensor 28 are input to the input port 35 via each A/D converter 37. An engine load sensor 41 is connected to the accelerator pedal 40, which generates an output voltage proportional to the amount of depression (L) of the accelerator pedal 40. The output signal of the engine load sensor 41 is also input to the input port 35 via a A/D converter 37. Further, the output signal of a crank angle sensor 42 for generating an output pulse each time the crankshaft rotates by, for example, 30 degrees is also input to the input port 35. The fuel injector 6, the electronic motor 15, the EGR control valve 23, the fuel pump 27, and a valve body 71a in a changeover portion 71 arranged on the exhaust pipe 18 are connected to the output port 36 via each drive circuit 38 to be actuated on the basis of the input signals. The changeover portion 71 and the valve body 71a will be explained in detail later.

As shown in FIGS. 2 and 3, in the embodiment of the present invention, the fuel injector 6 comprises a nozzle having six nozzle holes. Fuel sprays (F) are injected from the nozzle holes in slightly downward direction against a horizontal plane with equal angular intervals. As shown in FIG. 3, two fuel sprays (F) of the six fuel sprays (F) are scattered along the lower surface of each exhaust valve 9. FIGS. 2 and 3 show the case where fuel is injected at the end of the compression stroke. In this case, the fuel sprays (F) progress toward the inside periphery surface of the cavity 5 and, thereafter, is ignited and burned.

Figure 4:
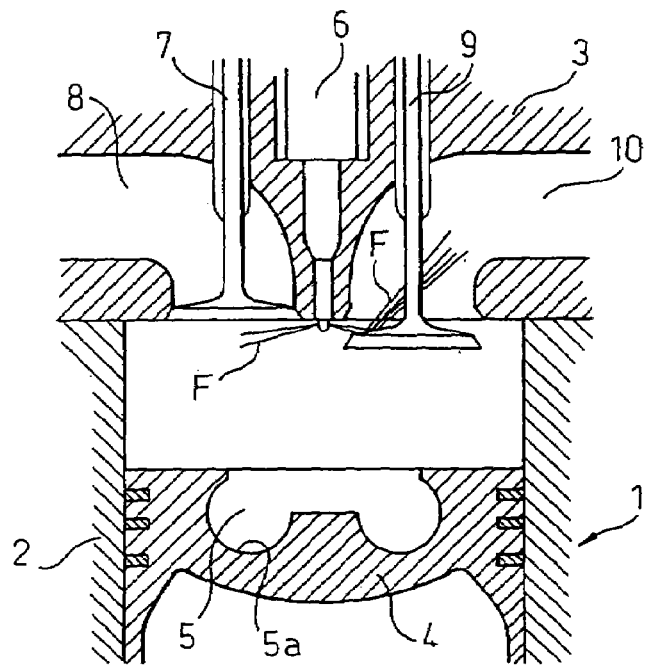
FIG. 4 is an enlarged vertical-sectional view of the combustion chamber of FIG. 1.
Figure 5:
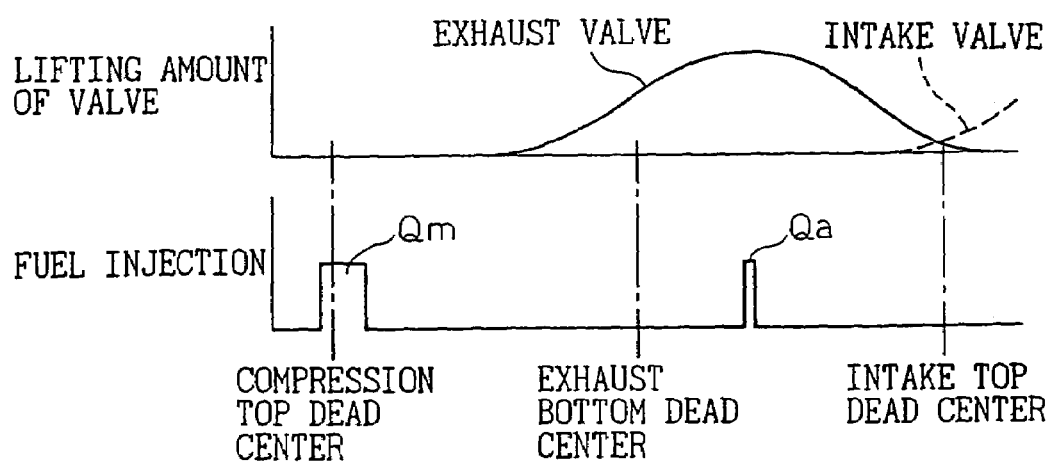
FIG. 5 is a view showing the relationship between the lifting amounts of the intake valve and the exhaust valve and the fuel injection.

FIG. 4 shows the case in that additional fuel is injected from the fuel injector 6 when the lifting amount of the exhaust valves is the maximum in the exhaust stroke. That is, FIG. 5 shows the case that the main fuel injection (Qm) is carried out close to the compression top dead center and thereafter the additional fuel injection (Qa) is carried out in the middle stage of the exhaust stroke. In this case, the fuel sprays (F) that progress toward the exhaust valves 9 are directed between the umbrella-like back surface of the exhaust valve 9 and the exhaust port 10. In other words, two nozzle holes, of the six nozzle holes of the fuel injector 6, are formed such that when the exhaust valves 9 are opened and the additional fuel injection (Qa) is carried out, the fuel sprays (F) are directed between the back surface of the exhaust valve 9 and the exhaust port 10. In the embodiment of FIG. 4, these fuel sprays (F) impinge on the back surface of the exhaust valve 9 and reflect from the back surface of the exhaust valves 9, and thus are directed into the exhaust port 10.

Figure 6:
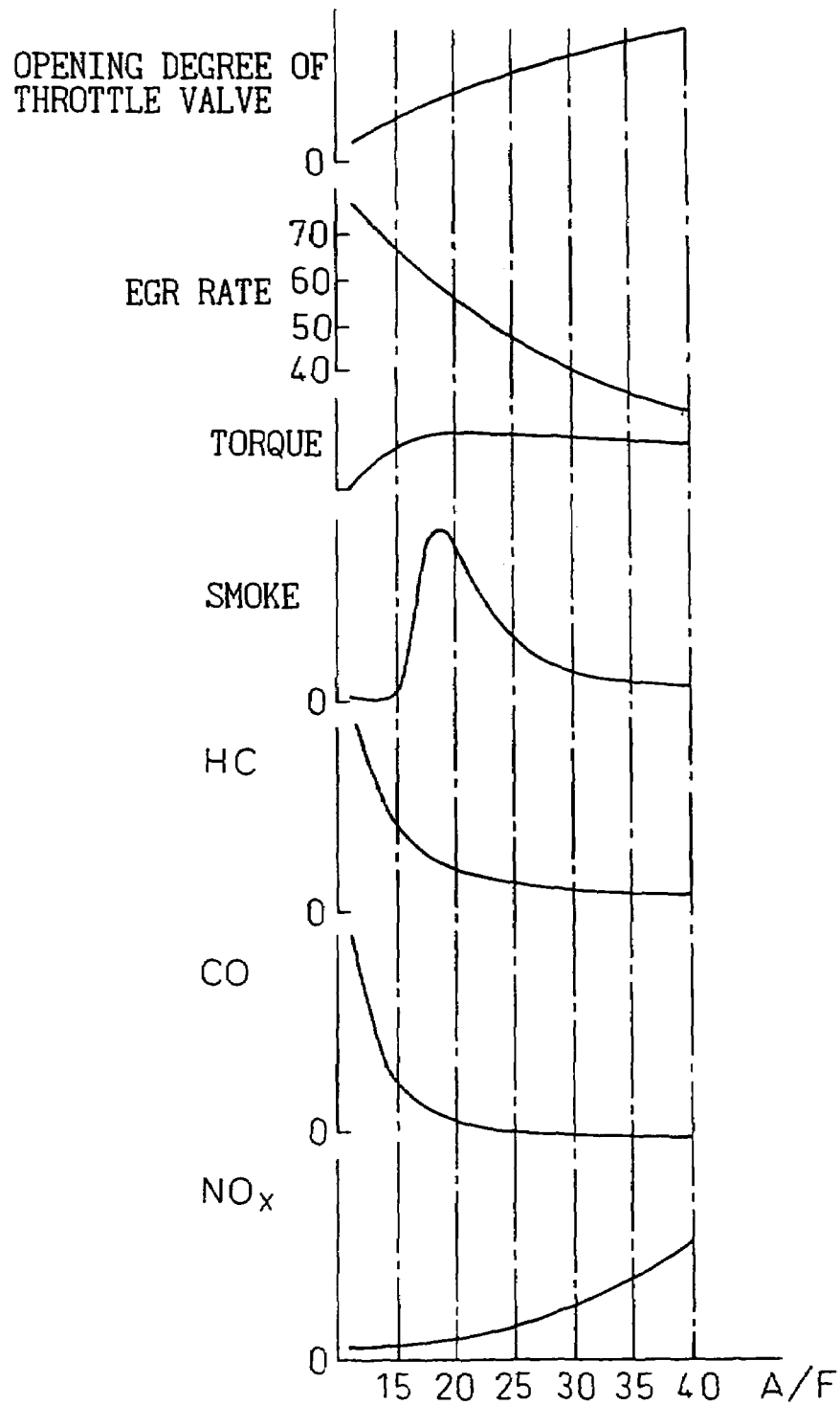

Usually, the additional fuel injection (Qa) is not carried out, and the main fuel injection (Qm) only is carried out. FIG. 6 indicates an example of an experiment showing the change in the output torque and the amount of smoke, HC, CO, and $NO_x$ exhausted at that time when changing the air-fuel ratio A/F (abscissa in FIG. 6) by changing the opening degree of the throttle valve 16 and the EGR rate at the time of low engine load operation. As will be understood from FIG. 6, in this experiment, the smaller the air-fuel ratio A/F becomes, the larger the EGR rate becomes. When the air-fuel ratio is below the stoichiometric air-fuel ratio (nearly equal 14.6), the EGR rate becomes over 65 percent.

As shown in FIG. 6, if the EGR rate is increased to reduce the air-fuel ratio A/F, when the EGR rate becomes close to 40 percent and the air-fuel ratio A/F becomes about 30, the amount of produced smoke starts to increase. Next, when the EGR rate is further increased and the air-fuel ratio A/F is made smaller, the amount of produced smoke sharply increases and peaks. Next, when the EGR rate is further increased and the air-fuel ratio A/F is made smaller, the amount of produced smoke sharply decreases. When the EGR rate is made over 65 percent and the air-fuel ratio A/F becomes close to 15.0, the amount of produced smoke is substantially zero. That is, almost no soot is produced. At this time, the output torque of the engine falls somewhat and the amount of produced $NO_x$ becomes considerably lower. On the other hand, at this time, the amounts of produced HC and CO start to increase.

Figure 7A:
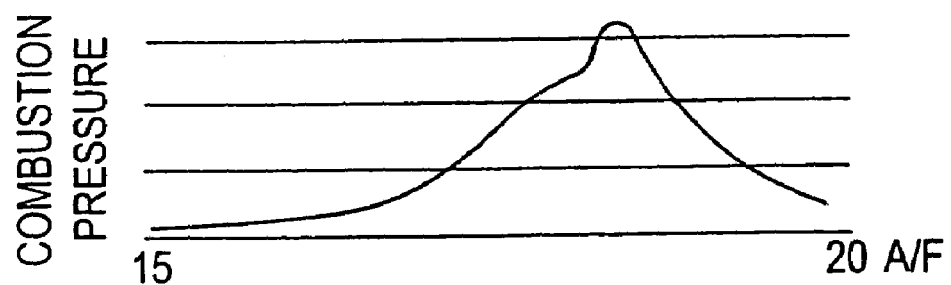
FIGS. 7(A) and 7(B) are views showing the combustion pressure.
Figure 7B:
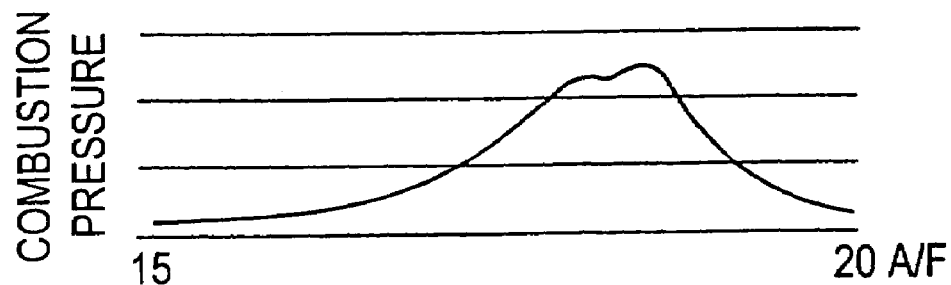

FIG. 7(A) shows the changes in combustion pressure in the combustion chamber 5 when the amount of produced smoke is the greatest near an air-fuel ratio A/F of 21. FIG. 7(B) shows the changes in combustion pressure in the combustion chamber 5 when the amount of produced smoke is substantially zero near an air-fuel ratio A/F of 18. As will be understood from a comparison of FIG. 7(A) and FIG. 7(B), the combustion pressure is lower in the case shown in FIG. 7(B), where the amount of produced smoke is substantially zero, than the case shown in FIG. 7(A) where the amount of produced smoke is large.

The following may be said from the results of the experiment shown in FIGS. 6 and 7. That is, first, when the air-fuel ratio A/F is less than 15.0 and the amount of produced smoke is substantially zero, the amount of produced $NO_x$ decreases considerably as shown in FIG. 6. The fact that the amount of produced $NO_x$ decreases means that the combustion temperature in the combustion chamber 5 falls. Therefore, it can be said that when almost no soot is produced, the combustion temperature in the combustion chamber 5 becomes lower. The same fact can be said from FIG. 7. That is, in the state shown in FIG. 7(B) where almost no soot is produced, the combustion pressure becomes lower, therefore the combustion temperature in the combustion chamber 5 becomes lower at this time.

Figure 8:
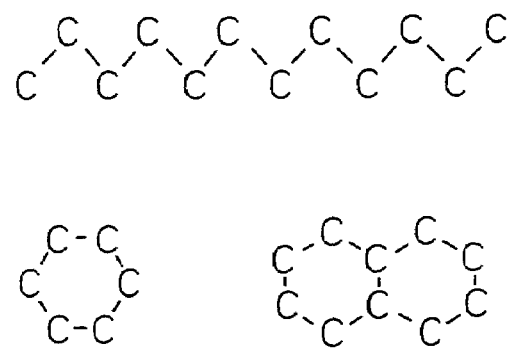
FIG. 8 is a view showing the fuel molecules.

Second, when the amount of produced smoke, that is, the amount of produced soot, becomes substantially zero, as shown in FIG. 6, the amounts of exhausted HC and CO increase. This means that the hydrocarbons are exhausted without changing into soot. That is, the straight chain hydrocarbons and aromatic hydrocarbons contained in the fuel and shown in FIG. 8 decompose when raised in temperature in an oxygen insufficient state resulting in the formation of a precursor of soot. Next, soot mainly composed of solid masses of carbon atoms is produced. In this case, the actual process of production of soot is complicated. How the precursor of soot is formed is not clear, but whatever the case, the hydrocarbons shown in FIG. 8 change to soot through the soot precursor. Therefore, as explained above, when the amount of production of soot becomes substantially zero, the amount of exhaust of HC and CO increases as shown in FIG. 6, but the HC at this time is a soot precursor or in a state of a hydrocarbon before that.

Summarizing these considerations based on the results of the experiments shown in FIGS. 6 and 7, when the combustion temperature in the combustion chamber 5 is low, the amount of produced soot becomes substantially zero. At this time, a soot precursor or a state of hydrocarbons before that is exhausted from the combustion chamber 5. More detailed experiments and studies were conducted. As a result, it was learned that when the temperature of the fuel and the gas around the fuel in the combustion chamber 5 is below a certain temperature, the process of growth of soot stops midway, that is, no soot at all is produced and that when the temperature of the fuel and the gas around the fuel in the combustion chamber 5 becomes higher than the certain temperature, soot is produced.

The temperature of the fuel and the gas around the fuel when the process of growth of hydrocarbons stops in the state of the soot precursor, that is, the above certain temperature, changes depending on various factors such as the type of the fuel, the air-fuel ratio, and the compression ratio, so it cannot be said exactly what it is, but this certain temperature is deeply related to the amount of production of $NO_x$. Therefore, this certain temperature can be defined to a certain degree from the amount of production of $NO_x$. That is, the greater the EGR rate is, the lower the temperature of the fuel, and the gas around it at the time of combustion, becomes and the lower the amount of produced $NO_x$ becomes. At this time, when the amount of produced $NO_x$ becomes around 10 ppm or less, almost no soot is produced any more. Therefore, the above certain temperature substantially corresponds to the temperature when the amount of produced $NO_x$ becomes around 10 ppm or less.

Once soot is produced, it is impossible to purify it by after-treatment using a catalyst having an oxidation function. As opposed to this, a soot precursor or a state of hydrocarbons before that can be easily purified by after-treatment using a catalyst having an oxidation function. Thus, it is extremely effective for the purifying of the exhaust gas that the hydrocarbons are exhausted from the combustion chamber 5 in the form of a soot precursor or a state before that with the reduction of the amount of produced $NO_x$.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression the temperatures of the fuel and the gas around it.

That is, if only air exists around the fuel, the vaporized fuel will immediately react with the oxygen in the air and burn. In this case, the temperature of the air away from the fuel does not rise so much. Only the temperature around the fuel becomes locally extremely high. That is, at this time, the air away from the fuel does not absorb much of the heat of combustion of the fuel at all. In this case, since the combustion temperature becomes extremely high locally, the unburned hydrocarbons receiving the heat of combustion produce soot.

On the other hand, when fuel exists in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises so much. That is, the combustion temperature can be kept low. That is, the presence of inert gas plays an important role in the suppression of the combustion temperature. It is possible to keep the combustion temperature low by the heat absorbing action of the inert gas.

In this case, to suppress the temperature of the fuel and the gas around it to a temperature lower than the temperature at which soot is produced, an amount of inert gas sufficient to absorb an amount of heat sufficient to lower the temperature is required. Therefore, if the amount of fuel increases, the amount of required inert gas increases. Note that, in this case, the larger the specific heat of the inert gas is, the stronger the heat absorbing action becomes. Therefore, a gas with a large specific heat is preferable as the inert gas. In this regard, since $CO_2$ and EGR gas have relatively large specific heats, it may be said to be preferable to use EGR gas as the inert gas.

Figure 9:
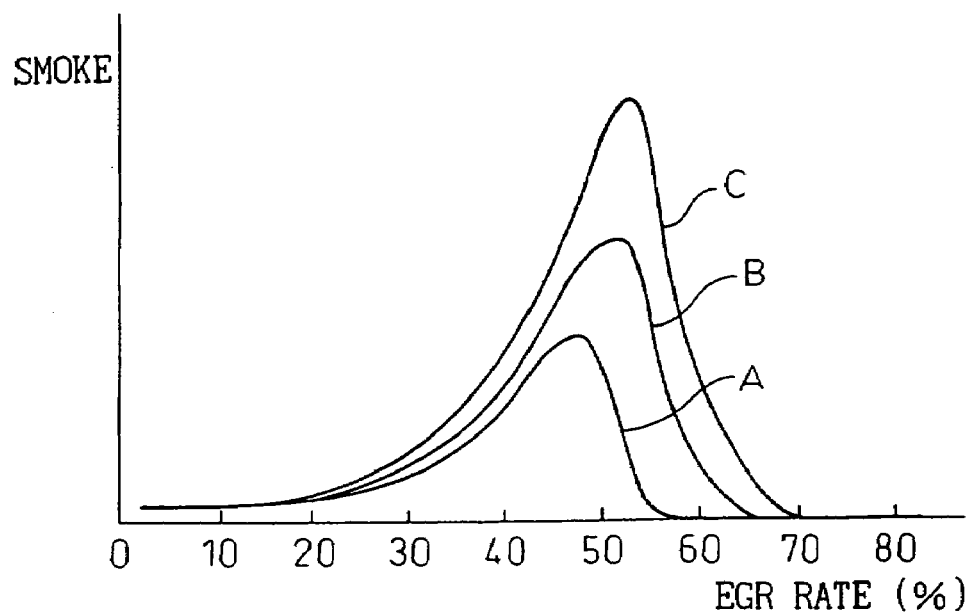
FIG. 9 is a view showing the relationship between the amount of produced smoke and the EGR rate.

FIG. 9 shows the relationship between the EGR rate and smoke when using EGR gas as the inert gas and changing the degree of cooling of the EGR gas. That is, the curve (A) in FIG. 9 shows the case of strongly cooling the EGR gas and maintaining the temperature of the EGR gas at about 90 degrees C., the curve (B) shows the case of cooling the EGR gas by a compact cooling apparatus, and the curve (C) shows the case of not compulsorily cooling the EGR gas.

When strongly cooling the EGR gas as shown by the curve (A) in FIG. 9, the amount of produced soot peaks when the EGR rate is a slightly below 50 percent. In this case, if the EGR rate is made about 55 percent or higher, almost no soot is produced.

On the other hand, when the EGR gas is slightly cooled as shown by the curve (B) in FIG. 9, the amount of produced soot peaks when the EGR rate is slightly higher than 50 percent. In this case, if the EGR rate is made above about 65 percent, almost no soot is produced.

Further, when the EGR gas is not forcibly cooled as shown by the curve (C) in FIG. 9, the amount of produced soot peaks near an EGR rate of 55 percent. In this case, if the EGR rate is made over about 70 percent, almost no soot is produced.

Note that FIG. 9 shows the amount of produced smoke when the engine load is relatively high. When the engine load becomes smaller, the EGR rate at which the amount of produced soot peaks falls somewhat, and the lower limit of the EGR rate, at which almost no soot is produced, also falls somewhat. In this way, the lower limit of the EGR rate at which almost no soot is produced changes in accordance with the degree of cooling of the EGR gas or the engine load.

Figure 10:
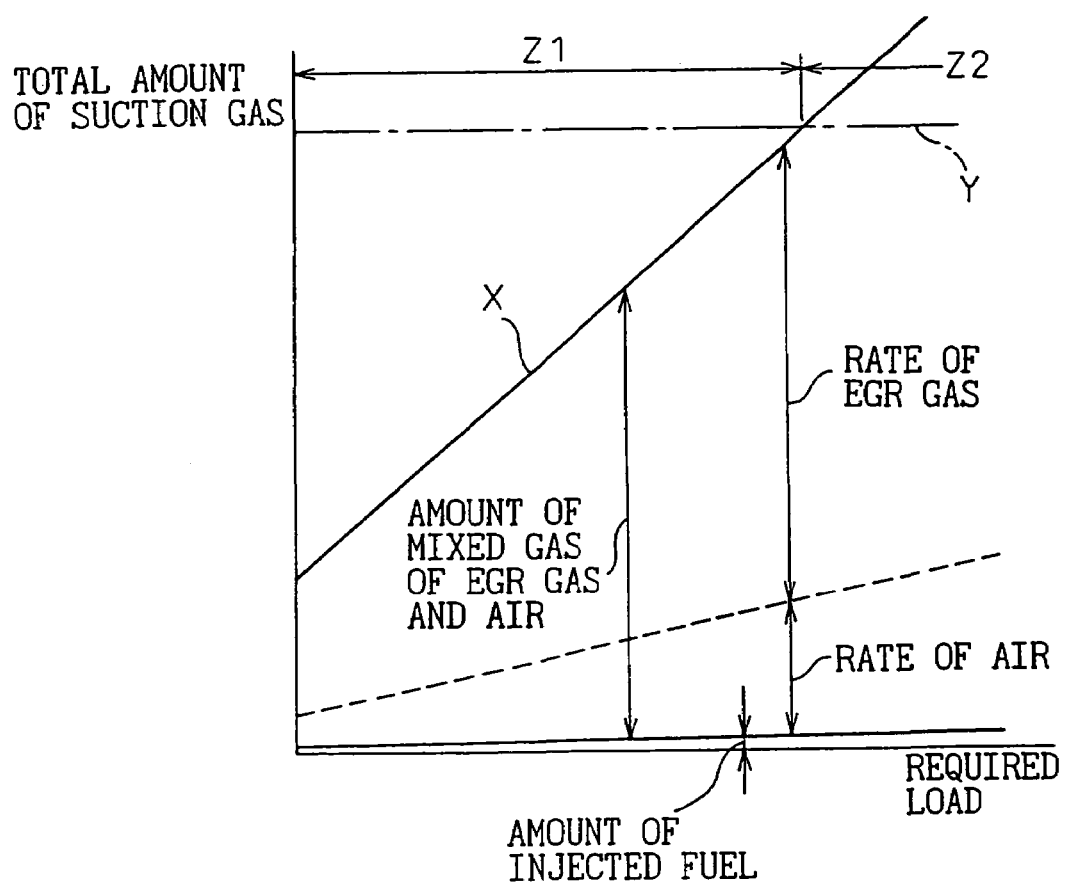
FIG. 10 is a view showing the relationship between the amount of injected fuel and the amount of mixed gas.

FIG. 10 shows the amount of mixed EGR gas and air, the ratio of air in the mixed gas, and the ratio of EGR gas in the mixed gas, required to make the temperature of the fuel and the gas around it, at the time of combustion, a temperature lower than the temperature at which soot is produced in the case of the use of EGR gas as an inert gas. Note that, in FIG. 10, the ordinate shows the total amount of suction gas taken into the combustion chamber 5. The broken line (Y) shows the total amount of suction gas able to be taken into the combustion chamber 5 when supercharging is not being performed. Further, the abscissa shows the required load. (Z1) shows the low engine load operation region.

Referring to FIG. 10, the ratio of air, that is, the amount of air in the mixed gas shows the amount of air necessary for causing the injected fuel to completely burn. That is, in the case shown in FIG. 10, the ratio of the amount of air and the amount of injected fuel becomes the stoichiometric air-fuel ratio. On the other hand, in FIG. 10, the ratio of EGR gas, that is, the amount of EGR gas in the mixed gas, shows the minimum amount of EGR gas required for making the temperature of the fuel, and the gas around it, a temperature lower than the temperature at which soot is produced when the injected fuel has burned completely. This amount of EGR gas is, expressed in term of the EGR rate, equal to or larger than 55 percent and, in the embodiment shown in FIG. 10, it is equal to or larger than 70 percent. That is, if the total amount of suction gas taken into the combustion chamber 5 is made the solid line (X) in FIG. 10 and the ratio between the amount of air and the amount of EGR gas in the total amount of suction gas (X) is made the ratio shown in FIG. 10, the temperature of the fuel and the gas around it becomes a temperature lower than the temperature at which soot is produced and therefore, no soot at all is produced. Further, the amount of produced $NO_x$ at this time is about 10 ppm or less and therefore the amount of produced $NO_x$ becomes extremely small.

If the amount of injected fuel increases, the amount of generated heat at the time of combustion increases, so, to maintain the temperature of the fuel and the gas around it at a temperature lower than the temperature at which soot is produced, the amount of heat absorbed by the EGR gas must be increased. Therefore, as shown in FIG. 10, the amount of EGR gas has to be increased with an increase in the amount of injected fuel. That is, the amount of EGR gas has to be increased as the required engine load becomes higher.

On the other hand, in the engine load region (Z2) of FIG. 10, the total amount of suction gas (X) required for inhibiting the production of soot exceeds the total amount of suction gas (Y) that can be taken in. Therefore, in this case, to supply the total amount of suction gas (X), required for inhibiting the production of soot, into the combustion chamber 5, it is necessary to supercharge or pressurize both the EGR gas and the intake air or just the EGR gas. When not supercharging or pressurizing the EGR gas etc., in the engine load region (Z2), the total amount of suction gas (X) corresponds to the total amount of suction gas (Y) that can be taken in. Therefore, in this case, to inhibit the production of soot, the amount of air is reduced somewhat to increase the amount of EGR gas and the fuel is made to burn in a state where the air-fuel ratio is rich.

As explained above, FIG. 10 shows the case of combustion of fuel at the stoichiometric air-fuel ratio. In the low engine load operating region (Z1) shown in FIG. 10, even if the amount of air is made smaller than the amount of air shown in FIG. 10, that is, even if the air-fuel ratio is made rich, it is possible to inhibit the production of soot and make the amount of produced $NO_x$ around 10 ppm or less. Further, in the low engine load operating region (Z1) shown in FIG. 10, even if the amount of air is made greater than the amount of air shown in FIG. 10, that is, the average air-fuel ratio is made lean of 17 to 18, it is possible to inhibit the production of soot and make the amount of produced $NO_x$ around 10 ppm or less.

That is, when the air-fuel ratio is made rich, the fuel is in excess, but since the combustion temperature is suppressed to a low temperature, the excess fuel does not change into soot and therefore soot is not produced. Further, at this time, only an extremely small amount of $NO_x$ is produced. On the other hand, when the average of air-fuel ratio is lean or when the air-fuel ratio is the stoichiometric air-fuel ratio, a small amount of soot is produced if the combustion temperature becomes higher, but the combustion temperature is suppressed to a low temperature, and thus no soot at all is produced. Further, only an extremely small amount of $NO_x$ is produced.

In this way, in the low engine load operating region (Z1), despite the air-fuel ratio, that is, whether the air fuel ratio is rich or the stoichiometric air-fuel ratio, or the average of air-fuel ratio is lean, no soot is produced and the amount of produced $NO_x$ becomes extremely small. Therefore, considering the improvement of the fuel consumption rate, it may be said to be preferable to make the average air-fuel ratio lean.

By the way, only when the engine load is relative low and the amount of generated heat is small, can the temperature of the fuel and the gas around the fuel in the combustion be suppressed to below a temperature at which the process of growth of soot stops midway. Therefore, in the embodiment of the present invention, when the engine load is relative low, the temperature of the fuel and the gas around the fuel in the combustion is suppressed to below a temperature at which the process of growth of soot stops midway and thus a first combustion, i.e., a low temperature combustion, is carried out. When the engine load is relative high, a second combustion, i.e., normal combustion, as usual, is carried out. Here, as can be understood from the above explanation, the first combustion, i.e., the low temperature combustion is a combustion in which the amount of inert gas in the combustion chamber is larger than the worst amount of inert gas causing the maximum amount of produced soot and thus no soot at all is produced. The second combustion, i.e., the normal combustion is a combustion in which the amount of inert gas in the combustion chamber is smaller than the worst amount of inert gas.

Figure 11:
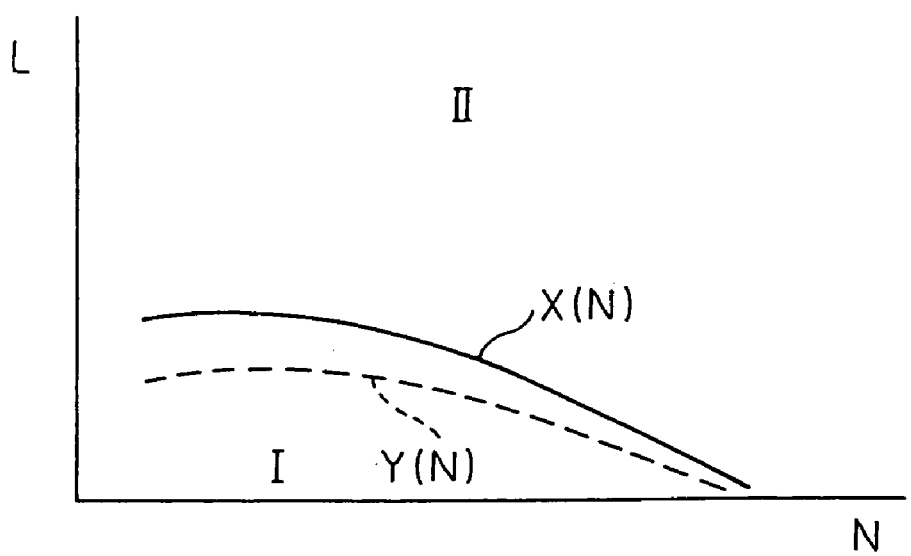
FIG. 11 is a view showing the first operating region (I) and the second operating region (II)

FIG. 11 shows a first operating region (I) in which the first combustion, i.e., the low temperature combustion is carried out and a second operating region (II) in which the second combustion, i.e., the normal combustion is carried out. In FIG. 11, the ordinate (L) shows the amount of depression of the accelerator pedal 40, i.e., the required engine load. The abscissa (N) shows the engine speed. Further, in FIG. 11, X(N) shows a first boundary between the first operating region (I) and the second operating region (II). Y(N) shows a second boundary between the first operating region (I) and the second operating region (II). The decision of changing from the first operating region (I) to the second operating region (II) is carried out on the basis of the first boundary X(N). The decision of changing from the second operating region (II) to the first operating region (I) is carried out on the basis of the second boundary Y(N).

That is, when the engine operating condition is in the first operating region (I) and the low temperature combustion is carried out, if the required engine load (L) increases beyond the first boundary X(N) that is a function of the engine speed (N), it is determined that the engine operating region shifts in the second operating region (II) and thus the normal combustion is carried out. Thereafter, if the required engine load (L) decreases below the second boundary Y(N) that is a function of the engine speed (N), it is determined that the engine operating region shifts in the first operating region (I) and thus the low temperature combustion is carried out again.

Figure 12:
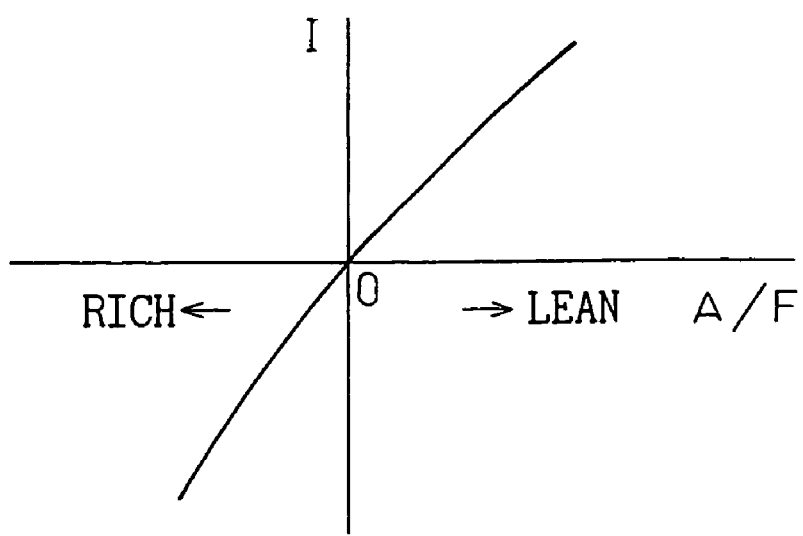
FIG. 12 is a view showing the output of the air-fuel ratio sensor.

FIG. 12 shows the output of the air-fuel ratio sensor 21. As shown in FIG. 12, the output current (I) of the air-fuel ratio sensor 21 changes in accordance with the air-fuel ratio A/F. Accordingly, the air-fuel ratio can be known from the output current (I) of the air-fuel ratio sensor 21. Next, referring FIG. 13, the engine operating control in the first operating region (I) and the second operating region (II) will be explained schematically.

Figure 13:
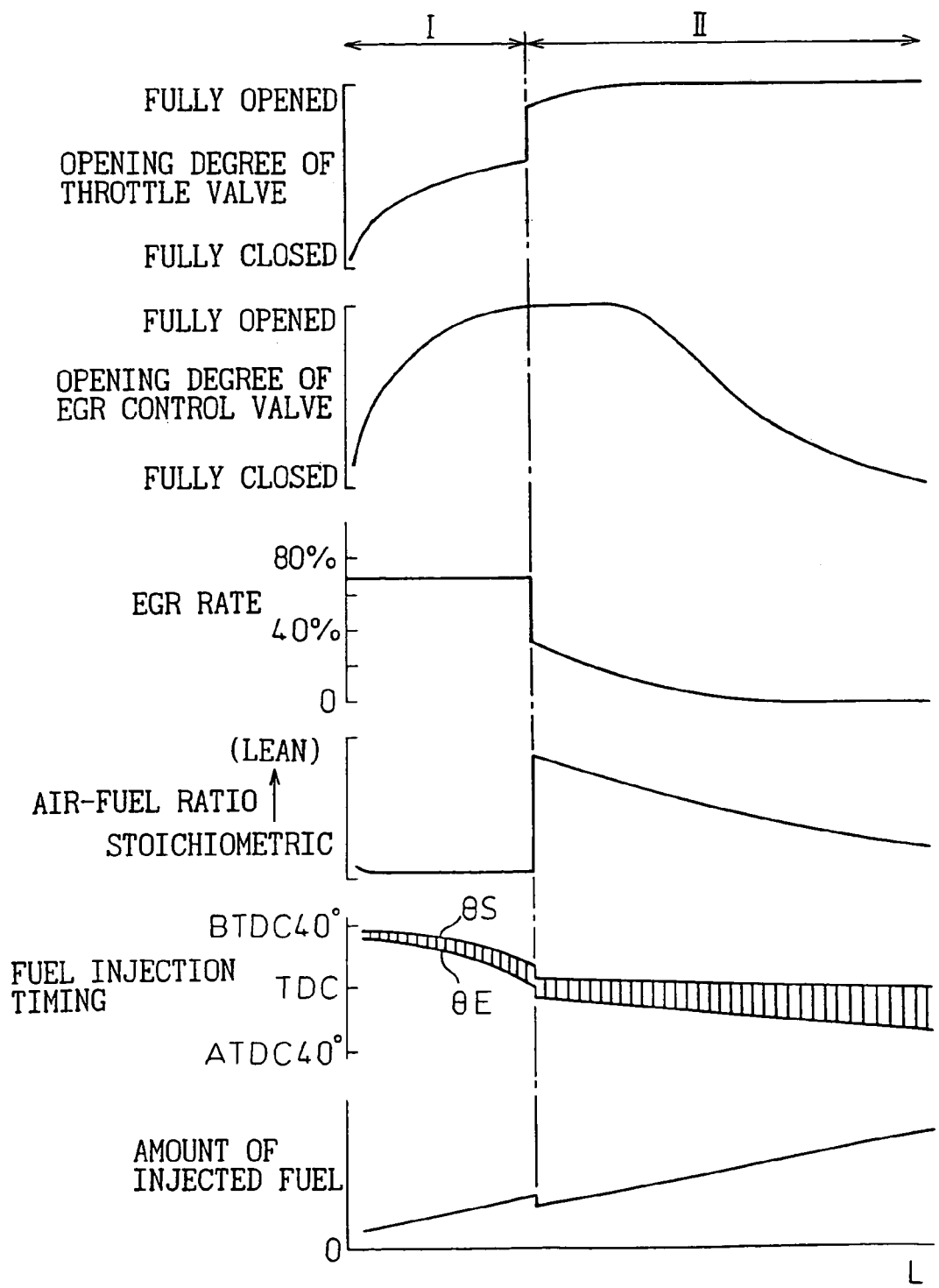

FIG. 13 shows the opening degree of the throttle valve 16, the opening degree of the EGR control valve 23, the EGR rate, the air-fuel ratio, the fuel injection timing, and the amount of injected fuel with respect to the required engine load (L). As shown in FIG. 13, in the first operating region (I) when the required engine load (L) is low, the throttle valve 16 is gradually opened from near the fully closed state to near the half opened state along with the increase of the required engine load (L), and the EGR control valve 23 is gradually opened from near the fully closed state to the fully opened state along with the increase in the required engine load (L). In the embodiment shown in FIG. 13, the EGR rate in the first operating region (I) is made about 70 percent and the air-fuel ratio therein is made slightly lean.

In the other words, in the first operating region (I), the opening degrees of the throttle valve 16 and the EGR control valve 23 are controlled such that the EGR rate becomes about 70 percent and the air-fuel ratio becomes a slightly lean air-fuel ratio. The air-fuel ratio at this time is controlled to the target air-fuel ratio to correct the opening degree of the EGR control valve 23 on the basis of the output signal of the air-fuel ratio sensor 21. In the first operating region (I), the fuel is injected before the compression top dead center TDC. In this case, the starting time ($\theta S$) of fuel injection is delayed along with the increase of the required engine load (L) and the ending time ($\theta E$) of fuel injection is delayed along with the delay of the starting time ($\theta S$) of fuel injection.

When in the idle operating mode, the throttle valve 16 is closed to near the fully closed state. At this time, the EGR control valve 23 is also closed to near the fully closed state. When the throttle valve 16 is closed near the fully closed state, the pressure in the combustion chamber 5 in the initial stage of the compression stroke is made low and thus the compression pressure becomes low. When the compression pressure becomes low, the compression work of the piston 4 becomes small and thus the vibration of the engine body 1 becomes small. That is, when in the idle operating mode, the throttle valve 16 is closed near the fully closed state to restrain the vibration of the engine body 1.

On the other hand, when the engine operating region changes from the first operating region (I) to the second operating region (II), the opening degree of the throttle valve 16 increases by a step from the half opened state toward the fully opened state. In this time, in the embodiment shown in FIG. 13, the EGR rate decreases by a step from about 70 percent to below 40 percent and the air-fuel ratio increases by a step. That is, the EGR rate jumps beyond the EGR rate extent (FIG. 9) in which the large amount of smoke is produced and thus the large amount of smoke is not produced when the engine operating region changes from the first operating region (I) to the second operating region (II).

In the second operating region (II), normal combustion, as usual, is carried out. This combustion causes some production of soot and $NO_x$. However, the thermal efficiency thereof is higher than that of the low temperature combustion. Thus, when the engine operating region changes from the first operating region (I) to the second operating region (II), the amount of injected fuel decreases by a step as shown in FIG. 13.

In the second operating region (II), the throttle valve 16 is hold in the fully opened state except in a part thereof. The opening degree of the EGR control valve 23 decreases gradually along with the increase of the required engine load (L). In this operating region (II), the EGR rate decreases along with the increase of the required engine load (L) and the air-fuel ratio decreases along with the increase of the required engine load (L). However, the air-fuel ratio is made a lean air-fuel ratio even if the required engine load (L) becomes high. Further, in the second operating region (II), the starting time ($\theta S$) of fuel injection is made near the compression top dead center TDC.

Figure 14:
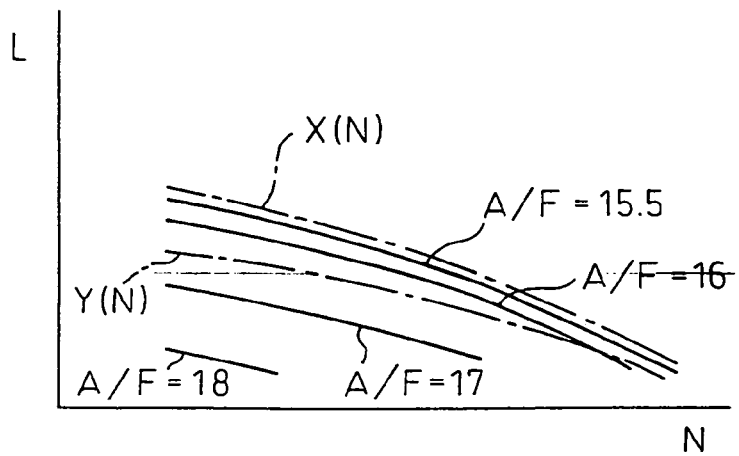
FIG. 14 is a view showing the air-fuel ratio in the first operating region (I)

FIG. 14 shows the air-fuel ratios A/F in the first operating region (I). In FIG. 14, the curves indicated by A/F=15.5, A/F=16, A/F=17, and A/F=18 shows respectively the cases where the air-fuel ratios are 15.5, 16, 17, and 18. The air-fuel ratio between two of the curves is defined by the proportional allotment. As shown in FIG. 14, in the first operating region (I), the air-fuel ratio is lean and the more the air-fuel ratio is lean, the lower the required engine load (L) becomes.

That is, the amount of generated heat in the combustion decreases along with the decrease of the required engine load (L). Therefore, even if the EGR rate decreases along with the decrease of the required engine load (L), the low temperature combustion can be carried out. When the EGR rate decreases, the air-fuel ratio becomes large. Therefore, as shown in FIG. 14, the air-fuel ratio A/F increases along with the decrease of the required engine load (L). The larger the air-fuel ratio becomes, the more the fuel consumption improves. Accordingly, in the present embodiment, the air-fuel ratio A/F increases along with the decrease in the required engine load (L) such that the air-fuel ratio is made lean as much as possible.

Figure 15A:
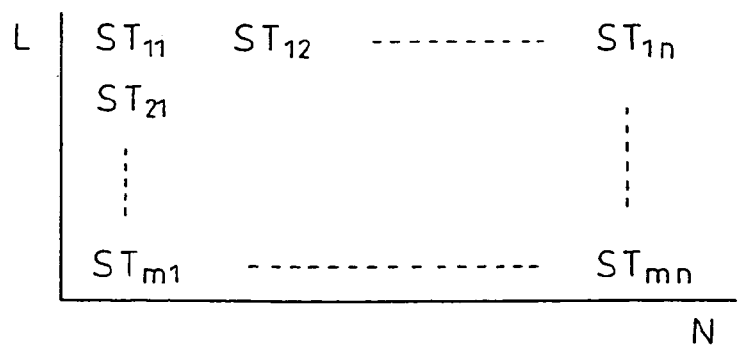
FIG. 15(A) is a view showing the target opening degree of the throttle valve.
Figure 15B:
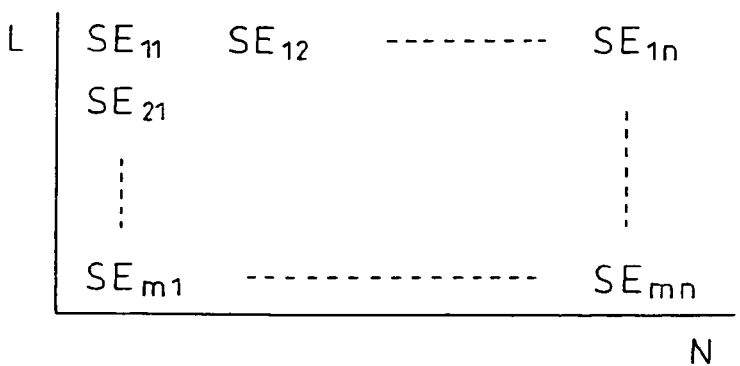
FIG. 15(B) is a view showing the target opening degree of the EGR control valve.

A target opening degree (ST) of the throttle valve 16 required to make the air-fuel ratio the target air-fuel ratio shown in FIG. 14 is memorized in ROM 32 of the electronic control unit as a map in which it is a function of the required engine load (L) and the engine speed (N) shown in FIG. 15(A). A target opening degree (SE) of the EGR control valve 23 required to make the air-fuel ratio the target air-fuel ratio shown in FIG. 14 is memorized in ROM 32 of the electronic control unit as a map in which it is a function of the required engine load (L) and the engine speed (N) shown in FIG. 15(B).

Figure 16:
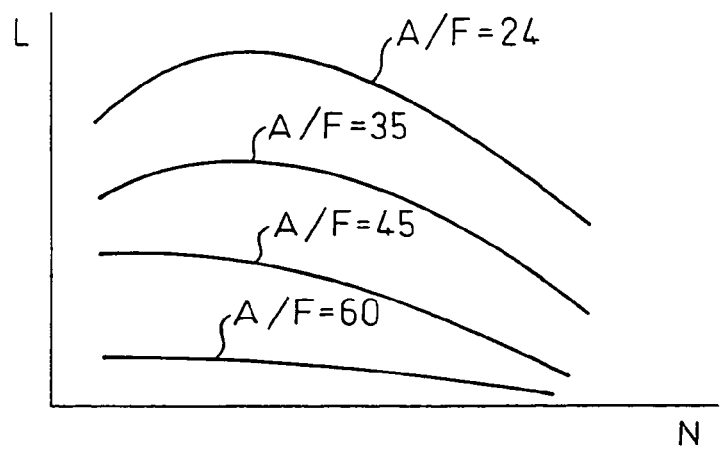
FIG. 16 is a view showing the air-fuel ratio in the second operating region (II)
Figure 17A:
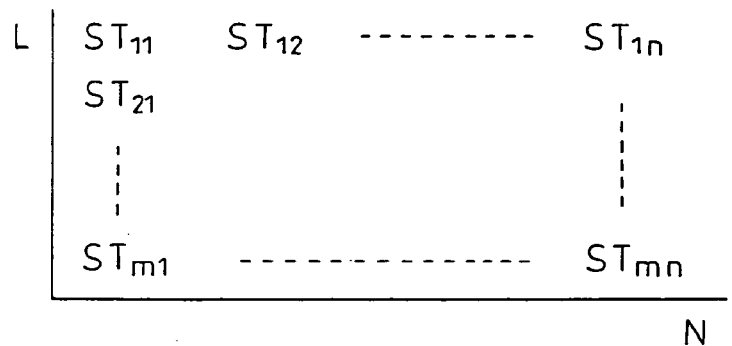
FIG. 17(A) is a view showing the target opening degree of the throttle valve.
Figure 17B:
FIG. 17(B) is a view showing the target opening degree of the EGR control valve.

FIG. 16 shows target air-fuel ratios when the second combustion, i.e., normal combustion, as usual, is carried out. In FIG. 16, the curves indicated by A/F=24, A/F=35, A/F=45, and A/F=60 shows respectively the cases where the target air-fuel ratios are 24, 35, 45, and 60. A target opening degree (ST) of the throttle valve 16 required to make the air-fuel ratio the target air-fuel ratio is memorized in ROM 32 of the electronic control unit as a map in which it is a function of the required engine load (L) and the engine speed (N) shown in FIG. 17(A). A target opening degree (SE) of the EGR control valve 23 required to make the air-fuel ratio the target air-fuel ratio is memorized in ROM 32 of the electronic control unit as a map in which it is a function of the required engine load (L) and the engine speed (N) shown in FIG. 17(B).

Thus, in the diesel engine of the present embodiment, the first combustion, i.e., the low temperature combustion, and the second combustion, i.e., the normal combustion, are changed over on the basis of the amount of depression (L) of the accelerator pedal 40 and the engine speed (N). In each combustion, the opening degrees of the throttle valve 16 and the EGR control valve are controlled on the basis of the maps shown in FIGS. 15 and 17.

Figure 18:
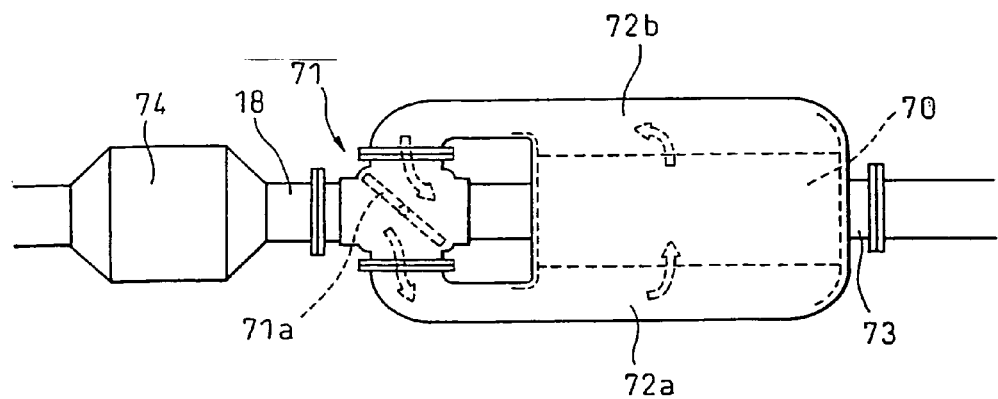
FIG. 18 is a plan view showing near the changeover portion and the particulate filter in the exhaust system.
Figure 19:
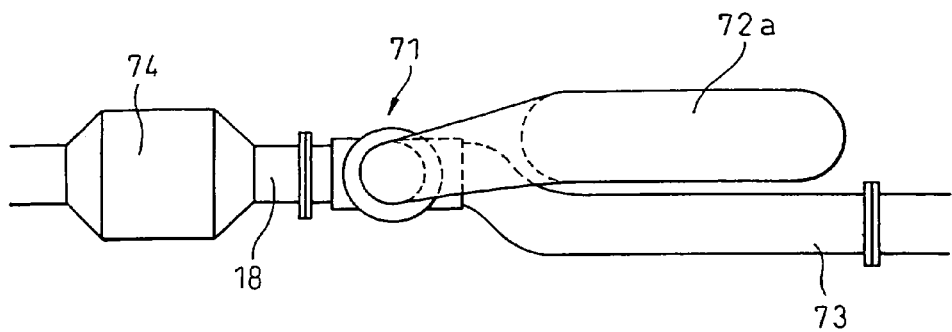
FIG. 19 is a side view of FIG. 18.

FIG. 18 is a plan view illustrating a device for purifying the exhaust gas of an embodiment, and FIG. 19 is a side view thereof. The device comprises a changeover portion 71 connected to the downstream of the exhaust manifold 17 via an exhaust pipe 18, a particulate filter 70, a first connecting portion 72a for connecting one side of the particulate filter 70 to the changeover portion 71, a second connecting portion 72b for connecting the other side of the particulate filter 70 to the changeover portion 71, and an exhaust passage 73 on the downstream of the changeover portion 71. The changeover portion 71 comprises a valve body 71a that shuts off the flow of exhaust gas in the changeover portion 71. The valve body 71a is driven by a negative pressure actuator, a step motor or the like. At one shut-off position of the valve body 71a, the upstream side in the changeover portion 71 is communicated with the first connecting portion 72a and the downstream side therein is communicated with the second connecting portion 72b, and thus the exhaust gas flows from one side of the particulate filter 70 to the other side thereof as shown by arrows in FIG. 18.

Figure 20:
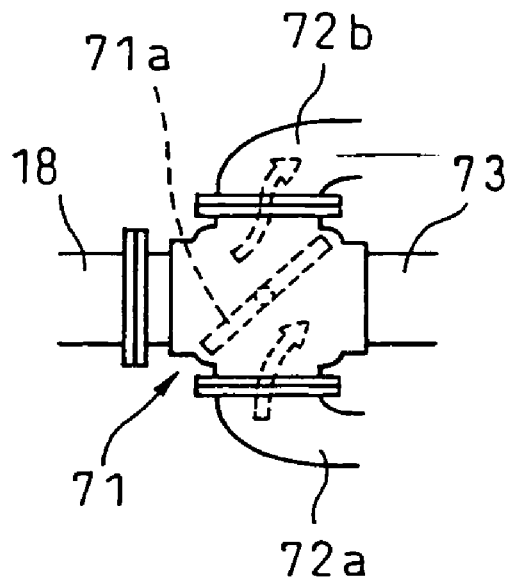
FIG. 20 is a view showing the other shut-off position of the valve body that is different from that in FIG. 18 in the changeover portion.

FIG. 20 illustrates another shut-off position of the valve body 71a. At this shut-off position, the upstream side in the changeover portion 71 is communicated with the second connecting portion 72b and the downstream side in the changeover portion 71 is communicated with the first connecting portion 72a, and thus the exhaust gas flows from the other side of the particulate filter 70 to the one side thereof as shown by arrows in FIG. 20. Thus, by changing over the valve body 71a, the direction of the exhaust gas flowing into the particulate filter 70 can be reversed, i.e., the exhaust gas upstream side and the exhaust gas downstream side of the particulate filter 70 can be reversed.

Figure 21:
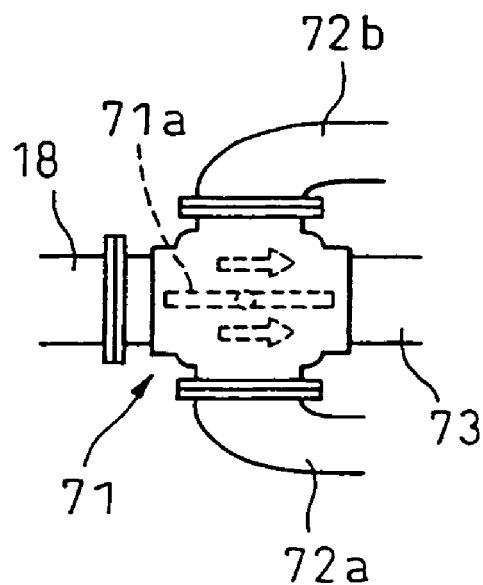
FIG. 21 is a view showing the middle position of the valve body in the changeover portion.

Further, FIG. 21 shows a middle position of the valve body 71a between the two shut-off positions. At the middle position, the changeover portion 71 is not shut off. The exhaust gas does not pass through the particulate filter 70 having a higher resistance. That is, the exhaust gas bypasses the particulate filter 70 and flows directly into the exhaust passage 73 as shown by arrows in FIG. 21.

Figure 22A:
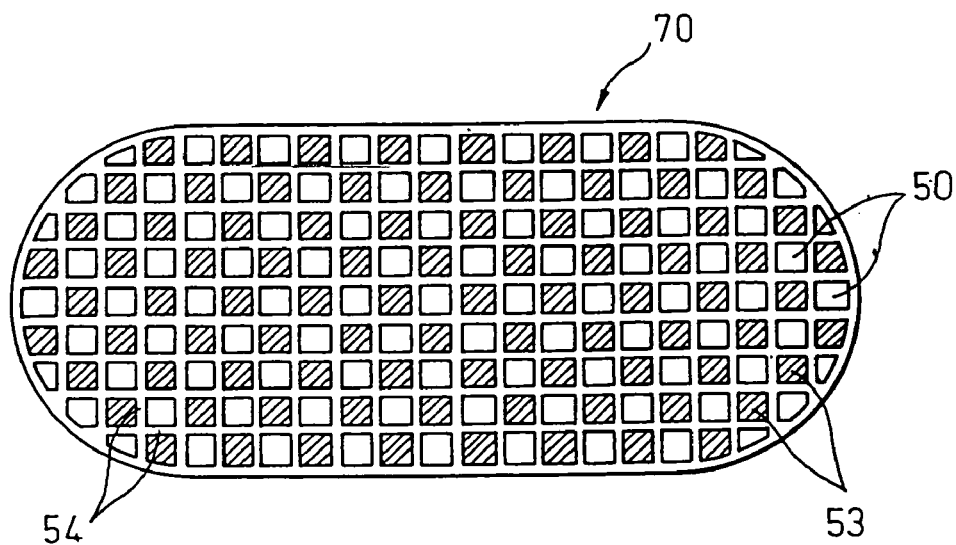
FIG. 22(A) is a front view showing the structure of the particulate filter.
Figure 22B:
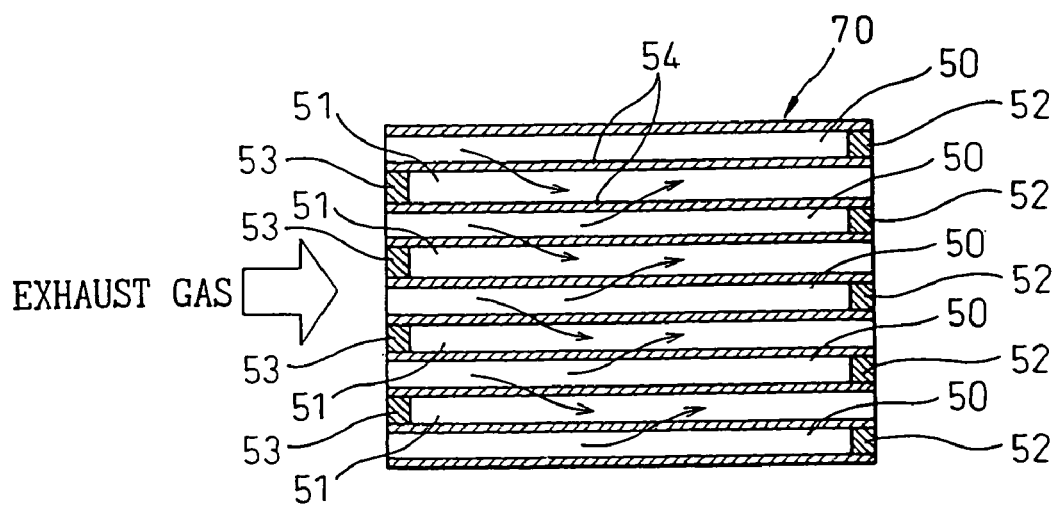
FIG. 22(B) is a side sectional view showing the structure of the particulate filter.

FIG. 22 shows the structure of the particulate filter 70, wherein FIG. 22(A) is a front view of the particulate filter 70 and FIG. 22(B) is a side sectional view thereof. As shown in these figures, the particulate filter 70 has an elliptic shape, and is, for example, the wall-flow type of a honeycomb structure formed of a porous material such as cordierite, and has many spaces in the axial direction divided by many partition walls 54 extending in the axial direction. One of any two neighboring spaces is closed by a plug 52 on the exhaust gas downstream side, and the other one is closed by a plug 53 on the exhaust gas upstream side. Thus, one of the two neighboring spaces serves as an exhaust gas flow-in passage 50 and the other one serves as an exhaust gas flow-out passage 51, causing the exhaust gas to necessarily pass through the partition wall 54 as indicated by arrows in FIG. 22(B). The particulates contained in the exhaust gas are much smaller than the pores of the partition wall 54, but collide with and are trapped on the exhaust gas upstream side surface of the partition wall 54 and the pores surface in the partition wall 54. Thus, each partition wall 54 works as a trapping wall for trapping the particulates. In the present particulate filter 70, in order to oxidize and remove the trapped particulates, an $NO_x$ absorbent and a noble metal catalyst as platinum Pt, which will be explained below, are carried on both side surfaces of the partition wall 54, and preferably also on the pore surfaces in the partition wall 54, by using an alumina or the like.

In the present embodiment, the $NO_x$ absorbent carried on the partition wall 54 is at least one selected from alkali metals such as potassium K, sodium Na, lithium Li, cesium Cs, and rubidium Rb, alkali earth metals such as barium Ba, calcium Ca, and strontium Sr, rare earth elements such as lanthanum La and yttrium Y, and transition metals. The $NO_x$ absorbent absorbs $NO_x$ when the air-fuel ratio (that is a ratio of the supplied air to the supplied fuel regardless of an amount of fuel burned by using oxygen in the supplied air) in the surrounding atmosphere is lean and releases the absorbed $NO_x$ when the air-fuel ratio becomes stoichiometric or rich, and thus the $NO_x$ absorbent carries out the absorbing and releasing actions of $NO_x$.

The $NO_x$ absorbent can actually carry out the absorbing and releasing actions of $NO_x$, but a part of the mechanism of the absorbing and releasing actions of $NO_x$ is not clear. However, it is believed that the absorbing and releasing actions of $NO_x$ takes place by the mechanism shown in FIGS. 23(A) and 23(B). Next, explained below is the mechanism with reference to the case where platinum Pt and barium Ba are carried on the partition wall of the particulate filter. The mechanism is the same as in the case of using another noble metal and another alkali metal, an alkali earth metal, or a rare earth element.

Figure 23A:
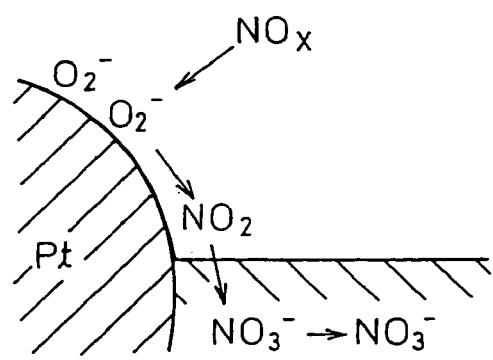
FIGS. 23(A) and 23(B) are views explaining the absorbing and releasing actions of $NO_x$.

Whether in the low temperature combustion or the normal combustion, when the air-fuel ratio is lean, oxygen concentration in the exhaust gas is high. At this time, oxygen $O_2$ in the exhaust gas adheres onto the surface of platinum Pt in the form of $O_2^-$ or $O^{2-}$ as shown in FIG. 23(A). On the other hand, NO in the exhaust gas reacts with $O_2^-$ or $O^{2-}$ on the surface of platinum Pt to produce $NO_2$ ($2NO+O_2\rightarrow 2NO_2$). Next, a part of the produced $NO_2$ is absorbed in the $NO_x$ absorbent while being oxidized on platinum Pt, and diffuses in the $NO_x$ absorbent in the form of nitric acid ion $NO_3^-$ while being combined with barium oxide BaO as shown in FIG. 23(A). Thus, in the present embodiment, $NO_x$ contained in the exhaust gas is absorbed in the $NO_x$ absorbent. As long as oxygen concentration in the surrounding atmosphere is high, $NO_2$ is produced on the surface of platinum Pt, and as long as the ability for absorbing $NO_x$ of the $NO_x$ absorbent does not saturate, $NO_2$ is absorbed in the $NO_x$ absorbent to produce nitric acid ions $NO_3^-$.

Figure 23B:
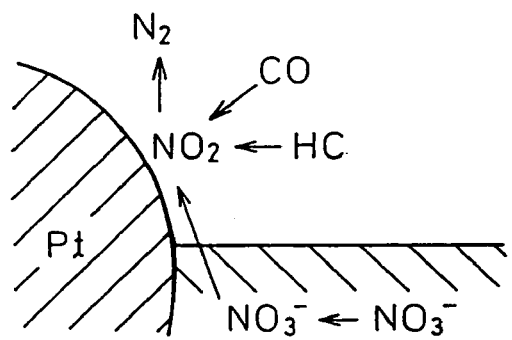

On the other hand, when the air-fuel ratio in the surrounding atmosphere is made rich, the oxygen concentration drops. As a result, an amount of $NO_2$ produced on the surface of platinum Pt drops. When the amount of produced $NO_2$ drops, the reaction reverses ($NO_3^-\rightarrow NO_2$) and thus nitric acid ions $NO_3^-$ in the $NO_x$ absorbent are released from the $NO_x$ absorbent in the form of $NO_2$. At this time, $NO_x$ released from the $NO_x$ absorbent is reduced to react with HC, CO, or the like contained in the surrounding atmosphere, as shown in FIG. 23(B). Thus, when $NO_2$ does not exist on the surface of platinum Pt, $NO_2$ is released from $NO_x$ absorbent. Accordingly, when the air-fuel ratio in the surrounding atmosphere is made rich, all of the absorbed $NO_x$ is released from the $NO_x$ absorbent in a short time. The released $NO_x$ is reduced and thus $NO_x$ is not discharged to the outside of the exhaust system.

Even when the air-fuel ratio in the surrounding atmosphere is made stoichiometric, $NO_x$ is released from $NO_x$ absorbent. However, in this case, $NO_x$ is released gradually from the $NO_x$ absorbent and thus a relative long period is required to release all of the $NO_x$ absorbed in the particulate filter.

Figure 24A:
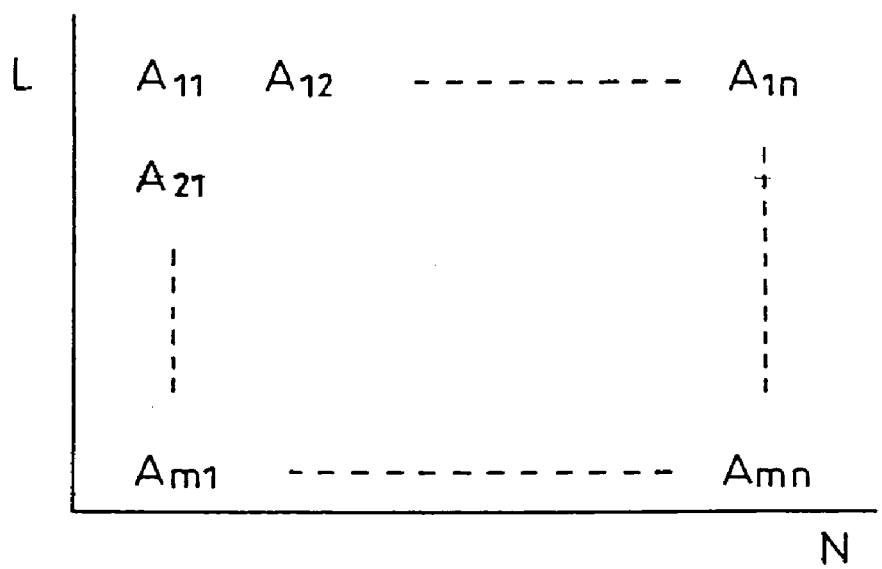
FIGS. 24(A) and 24(B) are maps of amounts of absorbed $NO_x$ per a unit time.
Figure 24B:
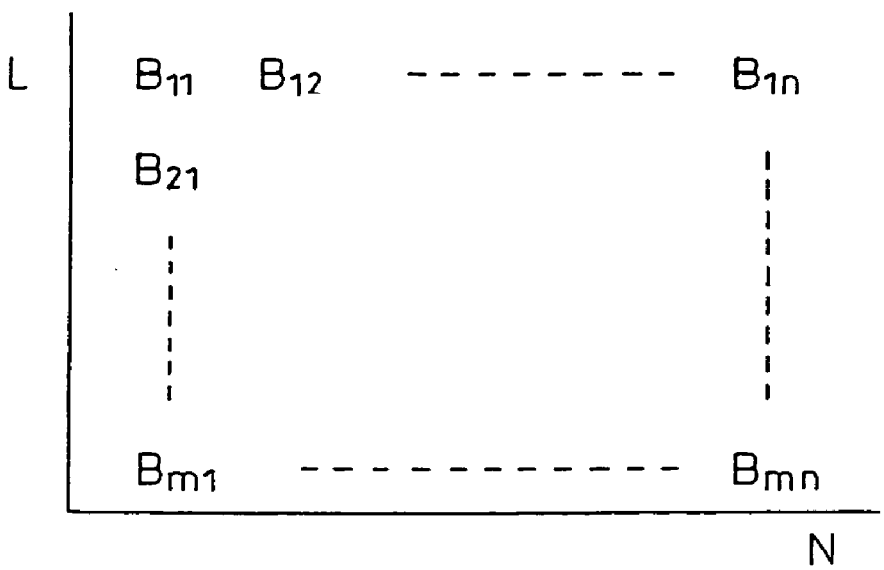

By the way, the ability for absorbing $NO_x$ in the $NO_x$ absorbent has a limit. Therefore, before the ability saturates, $NO_x$ must be released from the $NO_x$ absorbent. Namely, before a current amount of $NO_x$ absorbed in the particulate filter 70 reaches the limit amount of $NO_x$ that can be absorbed therein, $NO_x$ must be released from the particulate filter and the released $NO_x$ must be reduced and purified. For the purpose, a current amount of $NO_x$ absorbed in the particulate filter must be estimated. In the present embodiment, a map of amounts of $NO_x$ absorbed in the particulate filter per a unit time (A) in the low temperature combustion is predetermined as shown in FIG. 24(A). In the map, amounts of $NO_x$ absorbed in the particulate filter per a unit time (A) are set as functions of a required engine load (L) and an engine speed (N). A map of amounts of $NO_x$ absorbed in the particulate filter per a unit time (B) in the normal combustion is predetermined as shown in FIG. 24(B). In the map, amounts of $NO_x$ absorbed in the particulate filter per a unit time (B) are set as functions of a required engine load (L) and an engine speed (N). Therefore, a current amount of $NO_x$ absorbed in the particulate filter can be estimated to integrate these amounts of $NO_x$ absorbed in the particulate filter per a unit time (A) and (B). Here, when the low temperature combustion takes place in a rich air-fuel ratio, the absorbed $NO_x$ is released and thus an amount of $NO_x$ absorbed in the particulate filter per a unit time (A) become a minus value. In the present embodiment, when the estimated amount of $NO_x$ absorbed in the particulate filter becomes more than a predetermined permissible value, the low temperature combustion is carried out at the stoichiometric air-fuel ratio or a rich air-fuel ratio, fuel is injected into the cylinder in the exhaust stroke, or the like, and thus the air-fuel ratio in the surrounding atmosphere of the particulate filter 70 is made stoichiometric or rich to regenerate the particulate filter. This condition is maintained till the regeneration of the particulate filter is finished. The smaller the air-fuel ratio in the surrounding atmosphere is, the shorter the period in which this condition is maintained becomes.

Figure 25:
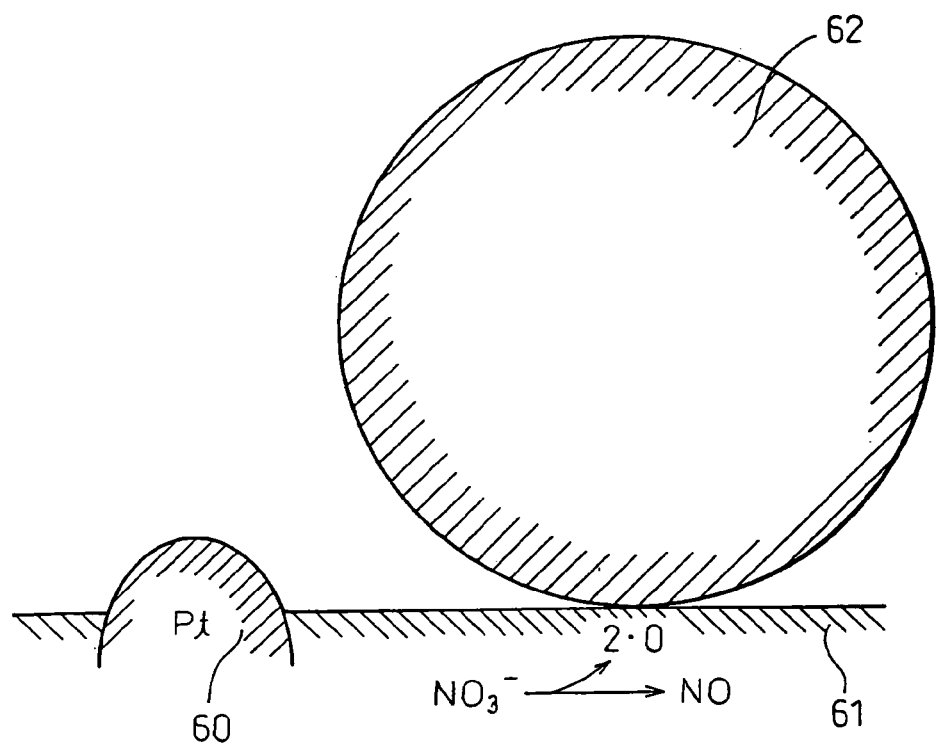
FIG. 25 is a view explaining the oxidizing action of the particulates.

By the way, the particulate filter carrying the $NO_x$ absorbent can favorably oxidize and remove the particulates trapped on the trapping walls. The mechanism is explained by using of FIG. 25. As mentioned above, $NO_x$ is absorbed in the $NO_x$ absorbent 61 in the form of nitric acid ions $NO_3^-$. When the particulate 62 adheres on the surface of the $NO_x$ absorbent, the oxygen concentration drops on the surface of the $NO_x$ absorbent 61 with which the particulate 62 is in contact. As the oxygen concentration drops, there occurs a difference in the concentration from the $NO_x$ absorbent 61 having a high oxygen concentration and, thus, oxygen in the $NO_x$ absorbent 61 tends to migrate toward the surface of the $NO_x$ absorbent 61 with which the particulate 62 is in contact. As a result, nitric acid ions $NO_3^-$ in the $NO_x$ absorbent 61 are decomposed into oxygen O and NO, whereby oxygen O migrates toward the surface of the $NO_x$ absorbent 61 with which the particulate 62 is in contact, and NO is emitted to the external side from the $NO_x$ absorbent 61. NO emitted to the outside is oxidized on platinum Pt on the downstream side and is absorbed again in the $NO_x$ absorbent 61.

On the other hand, oxygen O migrating toward the surface of the $NO_x$ absorbent 61 with which the particulate 62 is in contact is the oxygen O decomposed from a compound such as a nitrate. Oxygen O decomposed from the compound has a high level of energy and exhibits a very high activity. Therefore, oxygen migrating toward the surface of the $NO_x$ absorbent 61, with which the particulate 62 is in contact, is active-oxygen O. Upon coming into contact with active-oxygen O, the particulate 62 is oxidized without producing luminous flame in a short time of, for example, a few minutes or a few tens of minutes. Further, active-oxygen to oxidize the particulate 62 is also released when NO is absorbed in the $NO_x$ absorbent 61. That is, it can be considered that $NO_x$ diffuses in the $NO_x$ absorbent 61 in the form of nitric acid ions $NO_3^-$ while being combined with oxygen atoms and to be separated from an oxygen atom, and during this time, active-oxygen is produced. The particulates 62 are also oxidized by this active-oxygen. Further, the particulates adhered on the particulate filter 70 are oxidized not only by active-oxygen, but also by the oxygen contained in the exhaust gas.

Thus, if the $NO_x$ absorbent and the noble metal catalyst (which are referred to as a catalyst for absorbing and reducing $NO_x$ below) are carried on the particulate filter, the particulate filter is effective to purify $NO_x$ in the exhaust gas and to prevent blocking of the particulate filter meshes with oxidizing and removing the trapped particulates.

However, as mentioned above, the structure of the particulate filter is the wall-flow type in which the exhaust gas passes through the pores of the trapping walls. Therefore, in comparison with a usual catalytic apparatus in which the exhaust gas flows along the partition walls carrying a catalyst, a dimension between the trapping walls of the particulate filter must be larger than a dimension between the partition walls of the catalytic apparatus so that the same amount of exhaust gas can pass through the same size particulate filter as the catalytic apparatus. Thus, a frequency in which the exhaust gas is in contact with the catalyst for absorbing and reducing $NO_x$ carried on the surface of the trapping wall of the particulate filter is smaller than a frequency in which the exhaust gas is in contact with the catalyst for absorbing and reducing $NO_x$ carried on the surface of the partition wall of the catalytic apparatus. Besides, when the exhaust gas can pass through the pores of the trapping wall, the exhaust gas is in contact with the catalyst for absorbing and reducing $NO_x$ carried in the pores, but the exhaust gas is mainly in contact with only the catalyst for absorbing and reducing $NO_x$ carried on the surface of the trapping wall. In the particulate filter, an area for carrying the catalyst for absorbing and reducing $NO_x$ on the surface of the trapping wall is relative small due to many pores. Thus, even if the catalyst for absorbing and reducing $NO_x$ is carried on the particulate filter, $NO_x$ in the exhaust gas cannot be sufficiently purified.

To solve this problem, in the present embodiment, as shown in FIGS. 18 and 19, a catalytic apparatus for absorbing and reducing $NO_x$ 74 is arranged upstream the changeover portion 71 in the exhaust pipe 18. The catalytic apparatus 74 is to compensate the $NO_x$ purifying of the particulate filter 70 and thus does not need a large capacity. Accordingly, the catalytic apparatus for absorbing and reducing $NO_x$ 74 and the particulate filter 70 carrying the catalyst for absorbing and reducing $NO_x$ can sufficiently purify $NO_x$ in the exhaust gas together.

The catalytic apparatus 74 may carry the above-mentioned catalyst for absorbing and reducing $NO_x$ or a catalyst for reducing $NO_x$ selectively on a honeycomb structure carrier.

By the way, a soluble organic fraction SOF is also contained in the exhaust gas. SOF has an adhesion property, adheres the particulates each other on the particulate filter, and thus makes the particulates become a large mass. This makes it difficult to oxidize and remove the particulates on the particulate filter and to keep open the filter meshes. If the catalytic apparatus 74 carries a catalyst having an oxidation function such as the catalyst for absorbing and reducing $NO_x$, the catalytic apparatus 74 can burn SOF in the exhaust gas upstream the particulate filter 70 and thus can prevent blocking of the filter meshes.

By the way, the fuel contains sulfur S and thus $SO_x$ is produced in the combustion of the fuel. $SO_x$ is absorbed in the form of sulfate in the catalyst for absorbing and reducing $NO_x$ carried on the particulate filter 70 due to a mechanism similar to that of the case of $NO_x$. Sulfate can release active oxygen due to a mechanism similar to that of the case of nitrate. However, sulfate is stable and if the air-fuel ratio in the surrounding atmosphere is made rich, sulfate is hardly released from the particulate filter. In fact, sulfate remains on the particulate filter and thus an amount of absorbed sulfate increase gradually. An amount of nitrate or sulfate that can be absorbed in the particulate filter has a limit. If an amount of absorbed sulfate in the particulate filter increases (this is referred to as $SO_x$ pollution, below), an amount of nitrate that can be absorbed in the particulate filter decreases. Finally, the particulate filter cannot absorb $NO_x$.

In the present embodiment, the catalytic apparatus 74 carries the catalyst for absorbing and reducing $NO_x$ and thus the catalytic apparatus 74 positively absorbs $SO_x$ upstream of the particulate filter 70. Therefore, the $SO_x$ pollution of the particulate filter 70 can be prevented. However, the $SO_x$ pollution occurs in the catalytic apparatus 74. The $SO_x$ pollution of the catalytic apparatus 74 is avoided as follows.

First, it is determined if the recovery of the $SO_x$ pollution is required. In this determination, when an amount of fuel consumed until now reaches a predetermined amount, it can be determined that the recovery of the $SO_x$ pollution is required. Besides, also in the catalytic apparatus, the regeneration process for releasing $NO_x$ and purifying the released $NO_x$ is needed similarly to the particulate filter. In the regeneration process, the air-fuel ratio of the exhaust gas in the upstream side of the catalytic apparatus is made rich and reducing materials such as HC in the exhaust gas is used to reduce the released $NO_x$. Therefore, the air-fuel ratio of the exhaust gas in the downstream side of the catalytic apparatus becomes about stoichiometric. On the other hand, when the regeneration finishes, the air-fuel ratio of the exhaust gas in the downstream side of the catalytic apparatus becomes rich similar to that in the upstream side thereof. By using this, if a regeneration period is detected, it can be determined that the recovery of the $SO_x$ pollution is required because, when the $SO_x$ pollution progresses enough to require the recovery, an amount of absorbed $NO_x$ at the regeneration time is actually small so that the regeneration period is shortened.

When it is determined that the recovery of the $SO_x$ pollution is required, the combustion air-fuel ratio is made lean and thus a large amount of oxygen is contained in the exhaust gas. Simultaneously, fuel is injected into the cylinder in the exhaust stroke or fuel injected into the exhaust system upstream the catalytic apparatus 74 or the like. Thus, a sufficient amount of oxygen and a reducing material such as un-burned fuel are supplied to the catalytic apparatus. Therefore, the reducing material burns favorably due to the oxidation function of the catalytic apparatus.

Thus, the temperature of the catalytic apparatus rises about 600 degrees C. and thus the stable sulfate can be released as $SO_x$ when the air-fuel ratio in the surrounding atmosphere is made stoichiometric or rich and the oxygen concentration drops. If the temperature of the catalytic apparatus rises over 700 degrees C., the oxidation catalyst such as platinum Pt sinters and thus the oxidation function thereof drops. Therefore, the temperature of the exhaust gas immediately downstream of the catalytic apparatus is monitored and it is preferred to prevent the sintering of the oxidation catalyst. In the recovery process of the $SO_x$ pollution of the catalytic apparatus, the valve body 71a of the changeover portion 71 is set the middle position. Therefore, the released $SO_x$ from the catalytic apparatus bypasses the particulate filter 70 and the released $SO_x$ from the catalytic apparatus is not absorbed in the particulate filter again. When the air-fuel ratio in the surrounding atmosphere is made rich for a predetermined time after the temperature of the catalytic apparatus is made high, it can be determined that the recovery process of the $SO_x$ pollution finishes and the combustion air-fuel ratio is returned to the normal air-fuel ratio.

By the way, the higher the temperature of the particulate filter becomes, the more the platinum Pt and the $NO_x$ absorbent 61 are activated. Therefore, the higher the temperature of the particulate filter becomes, the larger the amount of active-oxygen O released from the $NO_x$ absorbent 61 per unit time becomes. Further, naturally, the higher the temperature of particulates is, the easier the particulates are oxidized. Therefore, the amount of particulates that can be oxidized and removed without producing luminous flame on the particulate filter per unit time increases along with an increase in the temperature of the particulate filter. Therefore, if the valve body 71a of the changeover portion 71 is set to one of the two shut-off positions simultaneously with or immediately after the finishing of the recovery process of the $SO_x$ pollution of the catalytic apparatus 74, the high temperature (600 degrees C.) of the exhaust gas is led to the particulate filter. Therefore, the temperature of the particulate filter rises and the particulates on the particulate filter are oxidized and removed easily.

Figure 26:
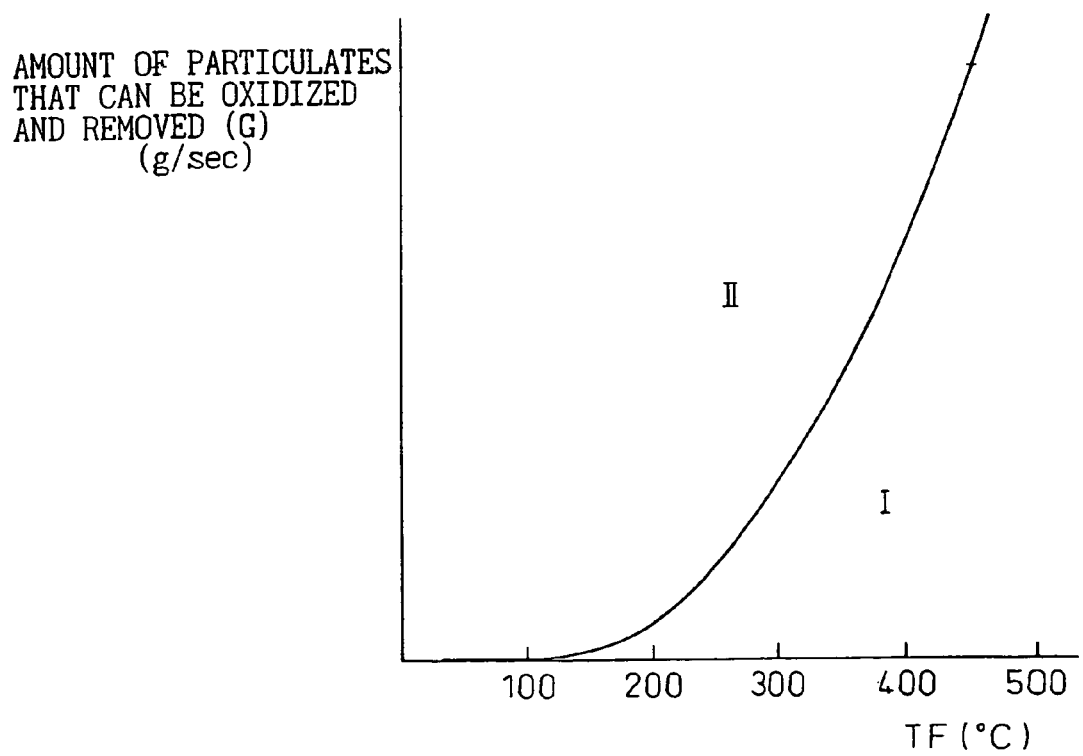
FIG. 26 is a view showing the relationship between the amount of particulates that can be oxidized and removed and the temperature of the particulate filter.

The solid line in FIG. 26 shows the amount of particulates (G) that can be oxidized and removed without producing luminous flame per unit time. In FIG. 26, the abscissa represents the temperature (TF) of the particulate filter. Here, FIG. 26 shows the case that the unit time is 1 second, that is, the amount of particulates (G) that can be oxidized and removed per 1 second. However, any time such as 1 minute, 10 minutes, or the like can be selected as a unit time. For example, in the case that 10 minutes is used as unit time, the amount of particulates (G) that can be oxidized and removed per unit time represents the amount of particulates (G) that can be oxidized and removed per 10 minutes. In this case also, the amount of particulates (G) that can be oxidized and removed without producing luminous flame increases along with an increase in the temperature of particulate filter 70 as shown in FIG. 26. The amount of particulates emitted from the combustion chamber per unit time is referred to as an amount of emitted particulates (M). When the amount of emitted particulates (M) is smaller than the amount of particulates (G) that can be oxidized and removed, for example, the amount of emitted particulates (M) per 1 second is smaller than the amount of particulates (G) that can be oxidized and removed per 1 second or the amount of emitted particulates (M) per 10 minutes is smaller than the amount of particulates (G) that can be oxidized and removed per 10 minutes, that is, in the area (I) of FIG. 26, the particulates emitted from the combustion chamber are all oxidized and removed without producing luminous flame successively on the particulate filter 70 for the above mentioned short time.

Figure 27A:
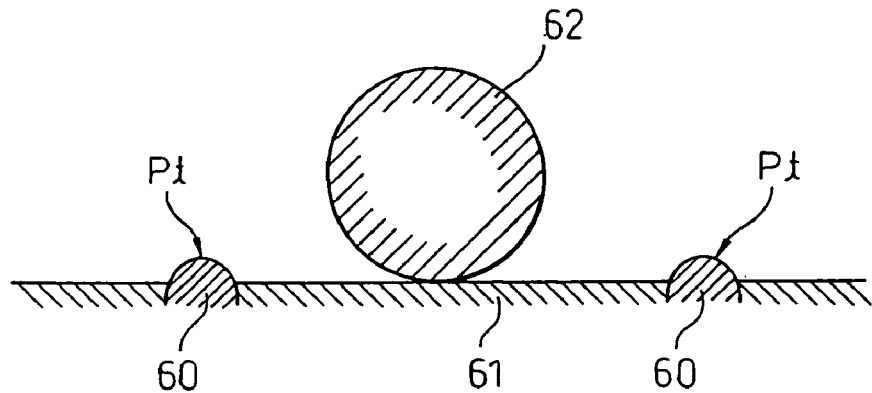
FIGS. 27(A), 27(B), and 27(C) are views explaining the depositing action of the particulates.
Figure 27B:
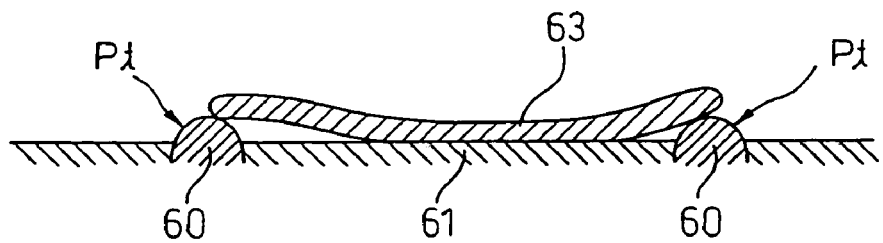
Figure 27C:
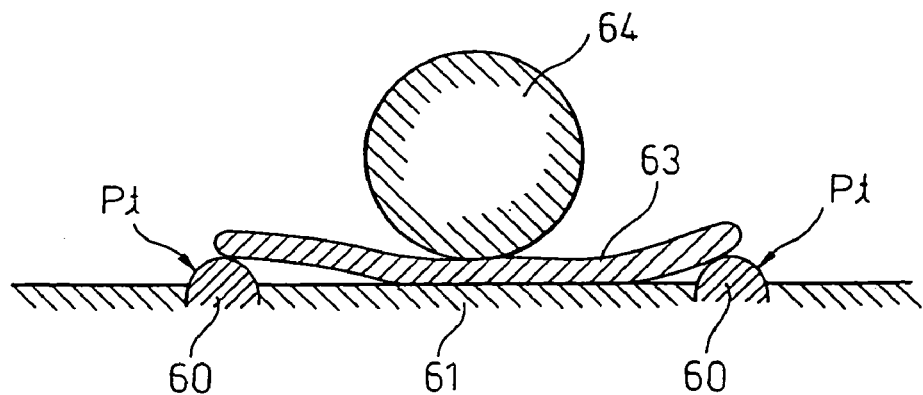

On the other hand, when the amount of emitted particulates (M) is larger than the amount of particulates that can be oxidized and removed (G), that is, in the area (II) of FIG. 26, the amount of active-oxygen is not sufficient for all particulates to be oxidized and removed successively. FIGS. 27(A) to (C) illustrate the manner of oxidation of the particulates in such a case.

That is, in the case that the amount of active-oxygen is lacking for oxidizing all particulates, when the particulates 62 adheres on the $NO_x$ absorbent 61, only a part of the particulates is oxidized as shown in FIG. 27(A), and the other part of the particulates that was not oxidized sufficiently remains on the exhaust gas upstream surface of the particulate filter. When the state where the amount of active-oxygen is lacking continues, a part of the particulates that was not oxidized remains on the exhaust gas upstream surface of the particulate filter successively. As a result, the exhaust gas upstream surface of the particulate filter is covered with the residual particulates 63 as shown in FIG. 27(B).

The residual particulates 63 are gradually transformed into carbonaceous matter that can hardly be oxidized. Further, when the exhaust gas upstream surface is covered with the residual particulates 63, the action of platinum Pt for oxidizing NO and $SO_2$, and the action of the $NO_x$ absorbent 61 for releasing active-oxygen are suppressed. The residual particulates 63 can be gradually oxidized over a relative long period. However, as shown in FIG. 27(C), other particulates 64 deposit on the residual particulates 63 one after the other, and when the particulates are deposited so as to laminate, even if they are the easily oxidized particulates, these particulates may not be oxidized since these particulates are separated away from platinum Pt or from the $NO_x$ absorbent. Accordingly, other particulates deposit successively on these particulates 64. That is, when the state where the amount of emitted particulates (M) is larger than the amount of particulates that can be oxidized and removed (G) continues, the particulates deposit to laminate on the particulate filter.

Thus, in the area (I) of FIG. 26, the particulates are oxidized and removed without producing luminous flame for the short time and in the area (II) of FIG. 26, the particulates are deposited to laminate on the particulate filter. Therefore, the deposition of the particulates on the particulate filter can be prevented if the relationship between the amount of emitted particulates (M) and the amount of particulates that can be oxidized and removed (G) is in the area (I). As a result, a pressure loss of the exhaust gas in the particulate filter hardly changes and is maintained at a minimum pressure loss value that is nearly constant. Thus, the decrease of the engine output can be maintained as low as possible. However, this is not always realized, and the particulates may deposit on the particulate filter if nothing is done.

Figure 28:
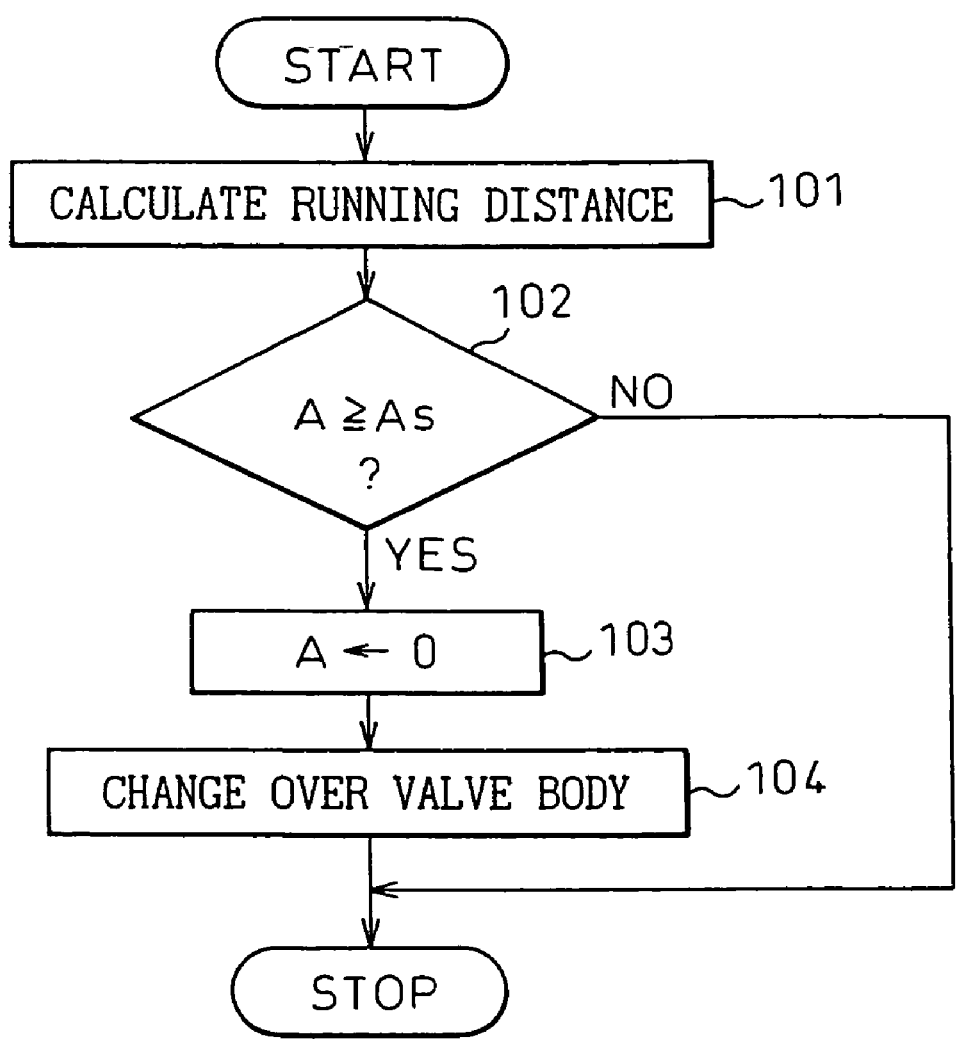
FIG. 28 is a flowchart for preventing the deposition of a large amount of particulates on the particulate filter.

In the present embodiment, to prevent the deposition of particulates on the particulate filter, the above electronic control unit 30 controls the valve body 71a according to a flowchart shown in FIG. 28. The present flowchart is repeated every a predetermined time. At step 101, a running distance (A) is calculated, and at step 102, it is determined if the running distance reaches a predetermined running distance (As). When the result is negative, the routine is stopped. However, when the result is positive, the routine goes to step 103 and the running distance is reset to 0. Thereafter, at step 104, the valve body 71a is changed over from one of the two shut-off positions to the other shut-off position and thus the upstream side and the downstream side of the particulate filter are reversed.

Figure 29:
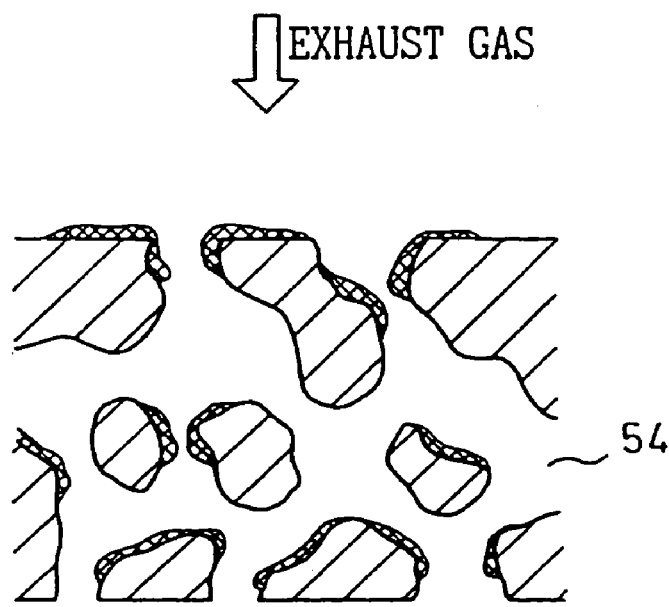
FIGS. 29(A) and 29(B) are enlarged sectional views of the partition wall of the particulate filter.
Figure 29:
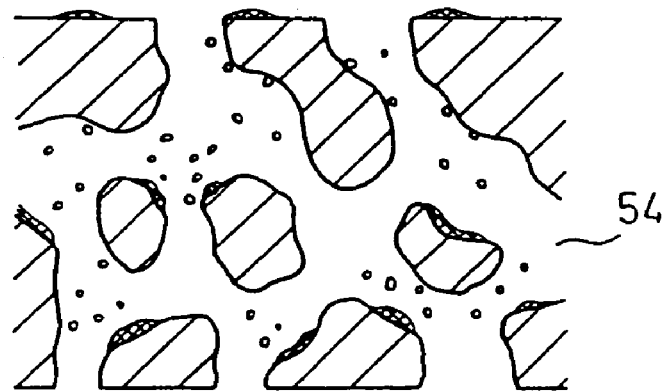

FIG. 29 is an enlarged sectional view of the partition wall 54 of the particulate filter. While the vehicle travels over the predetermined running distance (As), the engine operation in the area (II) of the FIG. 26 can be carried out. Thus, the particulates collide with and are trapped by the exhaust gas upstream surface of the partition wall 54 and the exhaust gas opposing surface in the pores therein, i.e., one of the trapping surfaces of the partition wall 54, and are oxidized and removed by active-oxygen released from the $NO_x$ absorbent, but the particulates can remain for the insufficient oxidization as shown in FIG. 29(A). At this stage, the exhaust resistance of the particulate filter does not have a bad influence on the traveling of the vehicle. However, if the particulates deposit more, problems in which the engine output drops considerably and the like occur. At this stage, the present flowchart reverses the upstream side and the downstream side of the particulate filter. Therefore, no particulates deposit again on the residual particulates on one of the trapping surfaces of the partition wall and thus the residual particulates can be gradually oxidized and removed by active-oxygen released from the one of the trapping surfaces. Further, in particular, the residual particulates in the pores in the partition wall are easily smashed into fine pieces by the exhaust gas flow in the reverse direction as shown in FIG. 29(B), and they mainly move through the pores toward the downstream side.

Accordingly, many of the particulates smashed into fine pieces diffuse in the pore in the partition wall, and they contact directly the $NO_x$ absorbent carried on the pores surface and are oxidized and removed. Thus, if the $NO_x$ absorbent is also carried on the pores surface in the partition wall, the residual particulates can be very easily oxidized and removed. On the other trapping surface that is now on the upstream side, as the flow of the exhaust gas is reversed, i.e., the exhaust gas upstream surface of the partition wall 54 and the exhaust gas opposing surface in the pores therein to which the exhaust gas mainly impinges (of the oppose side of one of the trapping surfaces), the particulates in the exhaust gas adhere newly thereto and are oxidized and removed by active-oxygen released from the $NO_x$ absorbent. In this oxidization, a part of the active-oxygen released from the $NO_x$ absorbent on the other trapping surface moves to the downstream side with the exhaust gas, and it is made to oxidize and remove the particulates that still remain on one of the trapping surfaces despite of the reversed flow of the exhaust gas.

That is, the residual particulates on one of the trapping surfaces are exposed to not only active-oxygen released from this trapping surface but also the remainder of the active-oxygen used for oxidizing and removing the particulates on the other trapping surface by reversing the flow of the exhaust gas. Therefore, even if some particulates deposit laminate on one of the trapping surfaces of the partition wall of the particulate filter when the exhaust gas flow is reversed, active-oxygen arrives at the deposited particulates and no particulates deposit again on the deposited particulates due to the reversed flow of the exhaust gas and thus the deposited particulates are gradually oxidized and removed and it can be oxidized and removed sufficiently for some period till the next reversal of the exhaust gas. Of course, by alternately using the one trapping surface and the other trapping surface of the partition wall, the amount of trapped particulates on each trapping surface is smaller than that of a particulate filter in which the single trapping surface always traps the particulates. This facilitates oxidizing and removal of the trapped particulates on the trapping surface.

In the present flowchart, the valve body is changed over every predetermined running distance. Thus, the valve body is changed over before the deposited particulates can transform into carbonaceous matter that can hardly be oxidized. Further, this can prevent problems in which the large amount of deposited particulates ignites and burns at once to melt the particulate filter by the burned heat thereof and the like. Further, when the valve body is reversed, even if the large amount of particulates has deposited on one of the trapping surfaces of the partition wall of the particulate filter, the deposited particulates are easily smashed into fine pieces by the reversed flow of the exhaust gas. A part of the particulates that cannot be oxidized and removed in the pores in the partition wall is discharged from the particulate filter. However, therefore, it is prevented that the exhaust resistance of the particulate filter increased more to have a bad influence on the operation of the vehicle. Further, the other trapping surface of the partition wall of the particulate filter can newly trap the particulates.

Thus, if the valve body is changed over every predetermined running distance, a large deposition of the particulates on the particulate filter can be prevented. The valve body does not limit to be changed over every predetermined running distance. For example, the valve body may be changed over every predetermined time or may be irregularly changed over.

In the present flowchart, utilizing an increase of the difference pressure between the exhaust gas upstream side and the exhaust gas downstream side of the particulate filter in accordance with an amount of particulates deposited on the particulate filter 70, when the difference pressure is larger than a predetermined pressure, it is determined that some particulates deposit on the particulate filter and thus the valve body may be changed over. Concretely, an exhaust pressure on the first connecting portion 72a (referring to FIG. 18) is detected by a pressure sensor arranged therein and an exhaust pressure on the second connecting portion 72b (referring to FIG. 18) is detected by another pressure arranged therein, and it is determined if the absolute value of the difference between the two pressures is larger than a predetermined value. Here, the absolute value is used in the determination. Therefore, even if the exhaust gas upstream side is either the first connecting portion 72a or the second connecting portion 72b, the increase in the difference pressure can be determined. Strictly speaking, the difference pressure between the both sides of the particulate filter changes in accordance with the pressure of the exhaust gas discharged from the combustion chamber every engine operating condition. Accordingly, in the determination of the deposition of the particulates, it is preferable to specify the engine operating condition.

Other than the difference pressure, in the determination for changing over the valve body, observing the change of electric resistance on a predetermined partition wall of the particulate filter, the fact that the electric resistance decreases along with the deposition of the particulates thereon can be utilized, or the fact that a transmissivity or reflectivity of light on a predetermined partition wall of the particulate filter drops along with the deposition of the particulate thereon can be utilized. Thus, if the valve body is changed over by the direct determination of the deposition of the particulates, it will certainly prevent the engine output dropping considerably.

Besides, to prevent the large deposition of the particulates, if the valve body is set from one shut-off position to the middle position in the recovery process of the $SO_x$ pollution of the catalytic apparatus, the valve body may be set the other shut-off position immediately after the finishing of the recovery process.

The present device for purifying the exhaust gas can reverse the exhaust gas upstream side and the exhaust gas downstream side of the particulate filter by a very simple structure. Further, the particulate filter requires a large opening area to facilitate the introduction of the exhaust gas. In the device, the particulate filter having a large opening area can be used without making it difficult to mount it on the vehicle as shown in FIGS. 18 and 19.

Further, when the air-fuel ratio in the surrounding atmosphere of the particulate filter is made rich, i.e., when the oxygen concentration therein is decreased, active-oxygen O is released at once time from the $NO_x$ absorbent 61 to the outside. Therefore, the deposited particulates become these that are easily oxidized by the large amount of active-oxygen released at one time, and can be oxidized and removed thereby without a luminous flame.

On the other hand, when the air-fuel ratio is maintained lean in the surrounding atmosphere of the particulate filter, the surface of platinum Pt is covered with oxygen, that is, oxygen contamination is caused. When such oxygen contamination is caused, the oxidization action to $NO_x$ of platinum Pt drops and thus the absorbing efficiency of $NO_x$ drops. Therefore, the amount of active-oxygen released from the $NO_x$ absorbent 61 decreases. However, when the air-fuel ratio is made rich, oxygen on the surface of Platinum Pt is consumed and thus the oxygen contamination is cancelled. Accordingly, when the air-fuel ratio is changed over from rich to lean again, the oxidization action to $NO_x$ becomes strong and thus the absorbing efficiency rises. Therefore, the amount of active-oxygen released from the $NO_x$ absorbent 61 increases.

Thus, when the air-fuel ratio is maintained lean, if the air-fuel ratio is changed over from lean to rich once in a while, the oxygen contamination of platinum Pt is cancelled every this time and thus the amount of released active-oxygen increases when the air-fuel ratio is lean. Therefore, the oxidization action of the particulates on the particulate filter 70 can be promoted.

Further, the cancellation of the oxygen contamination causes the reducing agent to burn and thus the burned heat thereof raises the temperature of the particulate filter. Therefore, in the particulate filter, the amount of particulates that can be oxidized and removed increases and thus the deposited particulates are oxidized and removed more easily. If the air-fuel ratio is made rich immediately after the upstream side and the downstream side of the particulate filter is reversed by the valve body 71a, the other trapping surface on which the particulates do not remain or deposit can release the large amount of active-oxygen. Thus, the large amount of released active-oxygen can oxidize and remove the deposited particulates more certainly. Of course, regardless of the reversal of the valve body 71a, the air-fuel ratio may be made rich once in a while. Therefore, the particulates hardly deposit on the particulate filter.

As a method to make the air-fuel ratio rich, for example, the above-mentioned low temperature combustion may be carried out. Of course, when changing over from the normal combustion to the low temperature combustion or before this, the exhaust gas upstream side and the exhaust gas downstream side of the particulate filter may be reversed. Further, to make the air-fuel ratio of the surrounding atmosphere rich, the combustion air-fuel ratio may be merely made rich. Further, in addition to the main fuel injection in the compression stroke, the fuel injector may inject fuel into the cylinder in the exhaust stroke or the expansion stroke (post-injection) or may injected fuel into the cylinder in the intake stroke (pre-injection). Of course, an interval between the post-injection or the pre-injection and the main fuel injection may not be provided. Further, fuel may be supplied to the exhaust system. Besides, in the catalytic apparatus and the particulate filter, the air-fuel ratio in the surrounding atmosphere must be at least temporarily made rich to release $NO_x$ from the $NO_x$ absorbent carried thereon. It is preferable to carry out the air-fuel ratio rich control immediately after the reversing of the upstream side and the downstream side of the particulate filter.

By the way, when $SO_3$ exists, calcium Ca in the exhaust gas forms calcium sulfate $CaSO_4$. Calcium sulfate $CaSO_4$ is hardly oxidized and remains on the particulate filter as ash. To prevent of blocking the meshes of the particulate filter caused by calcium sulfate $CaSO_4$, an alkali metal or an alkali earth metal having an ionization tendency stronger than that of calcium Ca, such as potassium K may be used as the $NO_x$ absorbent 61. Therefore, $SO_3$ diffused in the $NO_x$ absorbent 61 is combined with potassium K to form potassium sulfate $K_2SO_4$ and thus calcium Ca is not combined with $SO_3$ but passes through the partition walls of the particulate filter. Accordingly, the meshes of the particulate filter are not blocked by the ash. Thus, it is desired to use, as the $NO_x$ absorbent 61, an alkali metal or an alkali earth metal having an ionization tendency stronger than calcium Ca, such as potassium K, lithium Li, cesium Cs, rubidium Rb, barium Ba or strontium Sr.

In the above-mentioned embodiment, the particulate filter 70 carries the catalyst for absorbing and reducing $NO_x$. However, in another embodiment, the particulate filter may carry cerium Ce. Cerium Ce absorbs oxygen when the oxygen concentration in the surrounding atmosphere is high ($Ce_2O_3 \rightarrow 2CeO_2$) and releases oxygen when the oxygen concentration decreases ($2CeO_2 \rightarrow Ce_2O_3$). Thus, cerium Ce functions an oxygen absorbing agent. Iron Fe or tin Sn can be used as the oxygen absorbing agent. In the present embodiment, the particulate filter does not carry the catalyst for absorbing and reducing $NO_x$. However, the catalytic apparatus is arranged upstream the particulate filter, the catalytic apparatus can carry a large amount of catalyst for purifying $NO_x$, the catalysts do not become covered with the particulates due to the structure of the catalytic apparatus, and thus the catalytic apparatus can purify sufficiently $NO_x$ in the exhaust gas. In the present embodiment, the trapped particulates on the particulate filter ignite and burn with producing luminous flame at a high temperature. At this time, the catalyst for absorbing and reducing $NO_x$ is not carried on the particulate filter and thus the catalyst does not deteriorate. Further, when the air-fuel ratio in the exhaust gas is made rich to, for example, regenerate the catalytic apparatus, a part of unburned fuel (HC) included in the exhaust gas is not oxidized on the catalytic apparatus and can flow into the particulate filter. The unburned fuel has an adhesion property as same as the above-mentioned SOF and adheres the particulates each other on the particulate filter, and thus makes the particulates become a large mass. In the present embodiment, when the air-fuel ratio in the exhaust gas is rich, i.e., the oxygen concentration is low, cerium Ce releases oxygen as mentioned above and thus the released oxygen oxidizes the unburned fuel on the particulate filter. Therefore, a large mass of the particulates is not formed and thus the filter meshes is not blocked thereby. The oxygen absorbing as cerium Ce agent functions as an oxidation catalyst. In the present embodiment, if the particulate filter also carries a noble metal catalyst as platinum Pt, the unburned fuel can be oxidized more favorably. $SO_x$ in the exhaust gas adheres the oxygen absorbing agent on the particulate filter and the oxygen absorbing function thereof drops. However, in the present embodiment, the catalytic apparatus arranged upstream the particulate filter can treat $SO_x$ as mentioned above and thus $SO_x$ does not adhere the oxygen absorbing agent on the particulate filter. In the present embodiment, a noble metal such as platinum Pt can release active-oxygen from the held $NO_2$ and $SO_3$ on the surface thereof. The released active-oxygen can oxidize the particulates on the particulate filter. Further, oxygen released from the oxygen absorbing agent such as cerium Ce, iron Fe or tin Sn is also active-oxygen and thus the released active-oxygen can oxidize the particulates on the particulate filter. Thus, at least part of the trapped particulates is oxidized and removed and thus the particulates deposits hardly on the particulate filter of the present embodiment. In the above two embodiments, the catalytic apparatus functions to make uniform the temperature distribution in the exhaust gas before the exhaust gas flows into the particulate filter. Thus, it is prevented that only a part of the particulate filter reaches a low temperature. Accordingly, the trapped particulates are generally oxidized or burned and thus it is prevented that the particulates deposits on only the part of the particulate filter and the deposited particulates transform into carbonaceous matter that can hardly be oxidized or burned.

Although the invention has been described with reference to specific embodiments thereof, it should be apparent that numerous modifications can be made thereto, by those skilled in the art, without departing from the basic concept and scope of the invention.

The invention claimed is:
1. A device for purifying the exhaust gas of an internal combustion engine comprising:
  a particulate filter arranged in the exhaust system, wherein said particulate filter is a wall-flow particulate filter comprising a partition wall having pores, said partition wall carrying a catalyst for absorbing and reducing $NO_x$ on the exhaust gas upstream side surface thereof, said catalyst absorbing $NO_x$ when the air-fuel ratio in the surrounding atmosphere thereof is lean and releasing the absorbed $NO_x$ when said air-fuel ratio is stoichiometric or rich;

a catalytic apparatus for purifying $NO_x$ arranged in the exhaust system upstream of said particulate filter, which catalytic apparatus carries a catalyst absorbing $NO_x$ when the air-fuel ratio in the surrounding atmosphere thereof is lean and releasing the absorbed $NO_x$ when said air-fuel ratio is stoichiometric or rich; and control means for making the air-fuel ratio in said catalytic apparatus rich to release $NO_x$ from said catalyst of said catalytic apparatus to purify the released $NO_x$ by reduction, and making the air-fuel ratio in the particulate filter rich to release $NO_x$ from said catalyst of said particulate filter to purify the released $NO_x$ by reduction so that said catalyst of said particulate filter also releases active-oxygen to oxidize and remove the particulates trapped on said particulate filter without producing luminous flame.

2. A device for purifying the exhaust gas of an internal combustion engine comprising:

a particulate filter arranged in the exhaust system, which carries a catalyst for absorbing and reducing $NO_x$, said catalyst absorbing $NO_x$ when the air-fuel ratio in the surrounding atmosphere thereof is lean and releasing the absorbed $NO_x$ when said air-fuel ratio is stoichiometric or rich;

a catalytic apparatus for purifying $NO_x$ arranged in the exhaust system upstream of said particulate filter, which catalytic apparatus carries a catalyst absorbing $NO_x$ when the air-fuel ratio in the surrounding atmosphere thereof is lean and releasing the absorbed $NO_x$ when said air-fuel ratio is stoichiometric or rich;

control means for making the air-fuel ratio in said catalytic apparatus rich to release $NO_x$ from said catalyst of said catalytic apparatus to purify the released $NO_x$ by reduction, and making the air-fuel ratio in the particulate filter rich to release $NO_x$ from said catalyst of said particulate filter to purify the released $NO_x$ by reduction so that said catalyst of said particulate filter also releases active-oxygen to oxidize and remove the particulates trapped on said particulate filter without producing luminous flame; and bypassing means to make possible the exhaust gas bypass said particulate filter downstream said catalytic apparatus.

3. A device for purifying the exhaust gas of an internal combustion engine according to claim 2, wherein during the recovery process of the $SO_x$ pollution of said catalytic apparatus, said bypassing means makes the exhaust gas bypass said particulate filter.

4. A device for purifying the exhaust gas of an internal combustion engine according to claim 2, wherein immediately after the finishing of the recovery process of the $SO_x$ pollution of said catalytic apparatus, said bypassing means does not make the exhaust gas bypass said particulate filter and thus the exhaust gas passes through said particulate filter.

* * * * *